(12) United States Patent
Coroiu et al.

(10) Patent No.: US 11,709,811 B2
(45) Date of Patent: Jul. 25, 2023

(54) APPLICATIONS OF MACHINE LEARNING MODELS TO A BINARY SEARCH ENGINE BASED ON AN INVERTED INDEX OF BYTE SEQUENCES

(71) Applicant: CrowdStrike, Inc., Irvine, CA (US)

(72) Inventors: Horea Coroiu, Cluj-Napoca (RO); Daniel Radu, Bucharest (RO); Marian Radu, Bucharest (RO)

(73) Assignee: CrowdStrike, Inc., Irvine, CA (US)

( * ) Notice: Subject to any disclaimer, the term of this patent is extended or adjusted under 35 U.S.C. 154(b) by 927 days.

(21) Appl. No.: 16/411,850

(22) Filed: May 14, 2019

(65) Prior Publication Data

US 2019/0266141 A1  Aug. 29, 2019

Related U.S. Application Data

(63) Continuation-in-part of application No. 15/858,497, filed on Dec. 29, 2017, now Pat. No. 11,151,249, and a continuation-in-part of application No. 15/400,561, filed on Jan. 6, 2017, now Pat. No. 10,430,585.

(51) Int. Cl.
  *G06N 20/00* (2019.01)
  *G06F 21/56* (2013.01)
  *G06F 16/22* (2019.01)
  *G06F 16/953* (2019.01)

(52) U.S. Cl.
  CPC ........ *G06F 16/2228* (2019.01); *G06F 16/953* (2019.01); *G06N 20/00* (2019.01)

(58) Field of Classification Search
  CPC ................. G06F 21/562; G06F 21/564; G06F 2221/033; G06F 16/2228; G06F 16/901; G06N 20/00
  See application file for complete search history.

(56) References Cited

U.S. PATENT DOCUMENTS

| | | |
|---|---|---|
| 6,633,867 B1 | 10/2003 | Kraft et al. |
| 8,843,493 B1 | 9/2014 | Liao et al. |
| 9,501,506 B1 | 11/2016 | Fontoura et al. |
| 9,910,986 B1 | 3/2018 | Saxe et al. |
| 2004/0064442 A1 | 4/2004 | Popovitch |
| 2007/0050384 A1 | 3/2007 | Whang et al. |
| 2008/0133565 A1 | 6/2008 | Yasuda et al. |
| 2014/0089258 A1 | 3/2014 | She |

(Continued)

OTHER PUBLICATIONS

European Office Action dated Apr. 13, 2021 for European Patent Application No. 17207285.2, a counterpart foreign application of U.S. Pat. No. 10,430,585, 6 pages.

(Continued)

*Primary Examiner* — Minh Dinh
(74) *Attorney, Agent, or Firm* — Lee & Hayes, P.C.

(57) ABSTRACT

Techniques for searching an inverted index associating byte sequences of a fixed length and files that contain those byte sequences are described herein. Byte sequences comprising a search query are determined and searched in the inverted index. In some examples, training data for training machine learning model(s) may be created using pre-featured data from the inverted index. In various examples, training data may be used to retrain a ML model until the ML model meets a criterion. In some examples, the trained ML model may be used to perform searches on the inverted index and classify files.

20 Claims, 17 Drawing Sheets

(56) References Cited

U.S. PATENT DOCUMENTS

| | | | |
|---|---|---|---|
| 2016/0124966 | A1 | 5/2016 | Cohen |
| 2016/0267270 | A1 | 9/2016 | Lee et al. |
| 2016/0335286 | A1 | 11/2016 | Desineni et al. |
| 2017/0068732 | A1 | 3/2017 | Newman et al. |
| 2017/0262633 | A1 | 9/2017 | Miserendino et al. |
| 2018/0196943 | A1 | 7/2018 | Coroiu et al. |
| 2018/0196944 | A1 | 7/2018 | Coroiu et al. |
| 2018/0293381 | A1* | 10/2018 | Tseng ............... G06N 20/00 |
| 2019/0156030 | A1 | 5/2019 | Coroiu et al. |
| 2019/0156031 | A1 | 5/2019 | Coroiu et al. |
| 2019/0156032 | A1 | 5/2019 | Coroiu et al. |
| 2020/0159923 | A1 | 5/2020 | Coroiu et al. |
| 2020/0210575 | A1* | 7/2020 | Huang ............... G06N 20/00 |

OTHER PUBLICATIONS

Extended European Search Report from the European Patent Office for Application No. 20173057.9, dated Oct. 8, 2020, a counterpart foreign application of U.S. Appl. No. 16/411,850, 9 pages.

Li, et. al., "ROPNN: Detection of ROP Payloads Using Deep Neural Networks", arxiv.org, Cornell University Library, Jul. 29, 2018, pp. 1-11.

Office Action from European Patent Office for Application No. 17207285.2, dated Jun. 18, 2020, a counterpart foreign application of U.S. Pat. No. 10,430,585, 6 pgs.

Jain, et. al., "Byte Level n-Gram Analysis for Malware Detection", Springer-Verlag, 2011, pp. 51-59.

Kolter, et. al., "Learning to Detect Malicious Executables in the Wild", ACM, 2004, pp. 470-478.

Office Action for U.S. Appl. No. 15/858,497, dated Apr. 6, 2020, Coroiu, "Applications of a Binary Search Engine Based on an Inverted Index of Byte Sequences", 8 pgs.

Raff, et. al., "An investigation of byte n-gram features for malware classification", Springer-Velag, 2016, pp. 1-20.

Extended European Search Report from the European Patent Office for Application No. 18248145.7, dated Sep. 9, 2019, a counterpart foreign application of U.S. Appl. No. 16/411,850, 20 pages.

Jin, et al, "A Scalable Search Index for Binary Files", 2012 7th International Conference on Malicious and Unwanted Software, IEEE, Oct. 16, 2012, pp. 94-103.

Somil, et al, "Parallel Inverted Index for Large-Scale, Dynamic Digital Libraries", retrieved at <<URL:http://citeseerx.ist.psu.edu/viewdoc/download doi=10.1.1.605.6679&rep=rep1&type=pdf>>, Jan. 25, 2001, 100 pages.

Coulouris, et al., "Distributed Systems Concepts and Design", Addison Wesley,Third Edition, 2001, pp. 31-47.

Final Office Action dated Dec. 22, 2020 for U.S. Appl. No. 15/858,497, "Applications of a Binary Search Engine Based on an Inverted Index of Byte Sequences", Coroiu, 10 pages.

Ebringer, "Bindex 2.0," Virus Bulletin, retrieved from <<https://www.virusbulletin.com/conference/vb2011/abstracts/bindex-2-0/>> on Jan. 6, 2017, 1 page.

Extended European Search Report from the European Patent Office for Application No. 17207285.2, dated May 22, 2018, a counterpart foreign application of U.S. Appl. No. 16/411,850, 10 pages.

Partial European Search Report from the European Patent Office for Application No. 18248145.7, dated May 24, 2019, a counterpart foreign application of U.S. Appl. No. 16/411,850, 15 pages.

Partial Supplementary European Search Report from the European Patent Office for Application No. 17207285.2, dated Feb. 16, 2018, a counterpart foreign application of U.S. Appl. No. 16/411,850, 11 pages.

French, "Fuzzy Hashing Techniques in Applied Malware Analysis", Carnegie Mellon University, Mar. 28, 2011, 2 pages.

"GitHub—CrowdStrike/CrowdFMS: Crowdstrike Feed Management System," retrieved from https://git.hub.com./CrowdStrike/CrowdFMS on Dec. 28, 2017, 2 pages.

Karbab et. al., "Fingerprinting Android packaging: Generating DNAs for malware detection", Digital Investigation 18, 2016, pp. 33-45.

Lee et al, "Using syntactic information in handling natural language queries for extended boolean retrieval model," Pohang University of Science & Technology, 1999, 8 pages.

Li, et. al., "Experimental Study of Fuzzy Hasing in Malware Clustering Analysis", 2015, 8 pages.

Office Action for U.S. Appl. No. 16/252,359, dated Mar. 7, 2019, Coroiu, "Binary Search of Byte Sequences Using Inverted Indices," 5 pages.

Office Action for U.S. Appl. No. 16/252,388, dated Mar. 21, 2019, Coroiu, "Binary Search of Byte Sequences Using Inverted Indices", 7 pages.

Office Action for U.S. Appl. No. 15/400,561, dated Dec. 14, 2018, Coroiu, "Binary Search of Byte Sequences Using Inverted Indices", 6 pages.

Sauer et al., "Query Processing and Optimization using Compiler Tools", in the Proceedings of the 2010 Grundlagen von Datenbanken, May 28, 2010, 5 pages.

SourceForge, "ssdeep—Latest version 2.13," retrieved from <<http://ssdeep.sourceforge.net/>> on Jan. 6, 2017, last updated Apr. 24, 2015, 3 pages.

"Writing Yara Rules," Yara, published 2014, retrieved from http://yara.readthedocs.io/en/v3.7.0/ writingrules.html, on Dec. 28, 2017, 23 pages.

"Yara," Wikipedia, retrieved from https://en.wikipedia.org/wiki/YARA, on Dec. 28, 2017, 1 page.

* cited by examiner

1200 ⤵

```
GENERATE A FIRST MACHINE LEARNING (ML) MODEL USING PRE-FEATURED TRAINING
DATA FROM AN INVERTED INDEX, THE FIRST ML MODEL INCLUDING A STRING SECTION
AND A FIRST CONDITION SECTION, THE STRING SECTION INCLUDING ONE OR MORE
FEATURES, THE FIRST CONDITION SECTION INCLUDING ONE OR MORE WEIGHTS
CORRESPONDING TO THE ONE OR MORE FEATURES 1202
```

↓

```
DETERMINE A FIRST CONFIDENCE SCORE OF THE FIRST ML MODEL BASED AT LEAST IN
PART ON PREDETERMINED REFERENCE DATA INCLUDING MALICIOUS FILES 1204
```

↓

```
GENERATE A SECOND ML MODEL USING THE PRE-FEATURED TRAINING DATA AND
FALSE POSITIVES FROM DETERMINING THE FIRST CONFIDENCE SCORE, THE SECOND
ML MODEL INCLUDING THE STRING SECTION AND A SECOND CONDITION SECTION, THE
SECOND CONDITION SECTION INCLUDING AT LEAST ONE DIFFERENT WEIGHT OF THE
ONE OR MORE WEIGHTS 1206
```

↓

```
DETERMINE A SECOND CONFIDENCE SCORE OF THE SECOND ML MODEL BASED AT
LEAST IN PART ON THE PREDETERMINED REFERENCE DATA 1208
```

↓

```
PERFORM A FIRST SEARCH OF THE INVERTED INDEX USING THE FIRST ML MODEL 1210
```

↓

```
PERFORM A SECOND SEARCH OF THE INVERTED INDEX USING THE SECOND ML MODEL
1212
```

FIG. 12

APPLICATIONS OF MACHINE LEARNING MODELS TO A BINARY SEARCH ENGINE BASED ON AN INVERTED INDEX OF BYTE SEQUENCES

CROSS REFERENCE TO RELATED APPLICATION

This application is a continuation-in-part of, and claims priority to, co-pending commonly assigned U.S. patent application Ser. No. 15/400,561, entitled "BINARY SEARCH OF BYTE SEQUENCES USING INVERTED INDICES" and filed on Jan. 6, 2017, and U.S. patent application Ser. No. 15/858,497, entitled "APPLICATIONS OF A BINARY SEARCH ENGINE BASED ON AN INVERTED INDEX OF BYTE SEQUENCES" and filed on Dec. 29, 2017, all of which are incorporated herein by reference.

BACKGROUND

With computer and Internet use forming an ever greater part of day to day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is, for example, used by cyber attackers to disrupt computer operations, to access and to steal sensitive information stored on the computer or provided to the computer by a user, or to perform other actions that are harmful to the computer and/or to the user of the computer. Malware may include computer viruses, worms, Trojan horses, ransomware, rootkits, keyloggers, spyware, adware, rogue security software, and other malicious programs and malware may be formatted as executable files, dynamic link libraries (DLLs), scripts, and/or other types of computer programs.

Malware authors or distributors ("adversaries") frequently disguise or obfuscate malware in attempts to evade detection by malware-detection or -removal tools. Consequently, it is time consuming to determine if a program is malware.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 12 is a flow diagram of an illustrative process associated with the binary search engine, including training a machine learning model to search an inverted index.

DETAILED DESCRIPTION

Figure 1A:
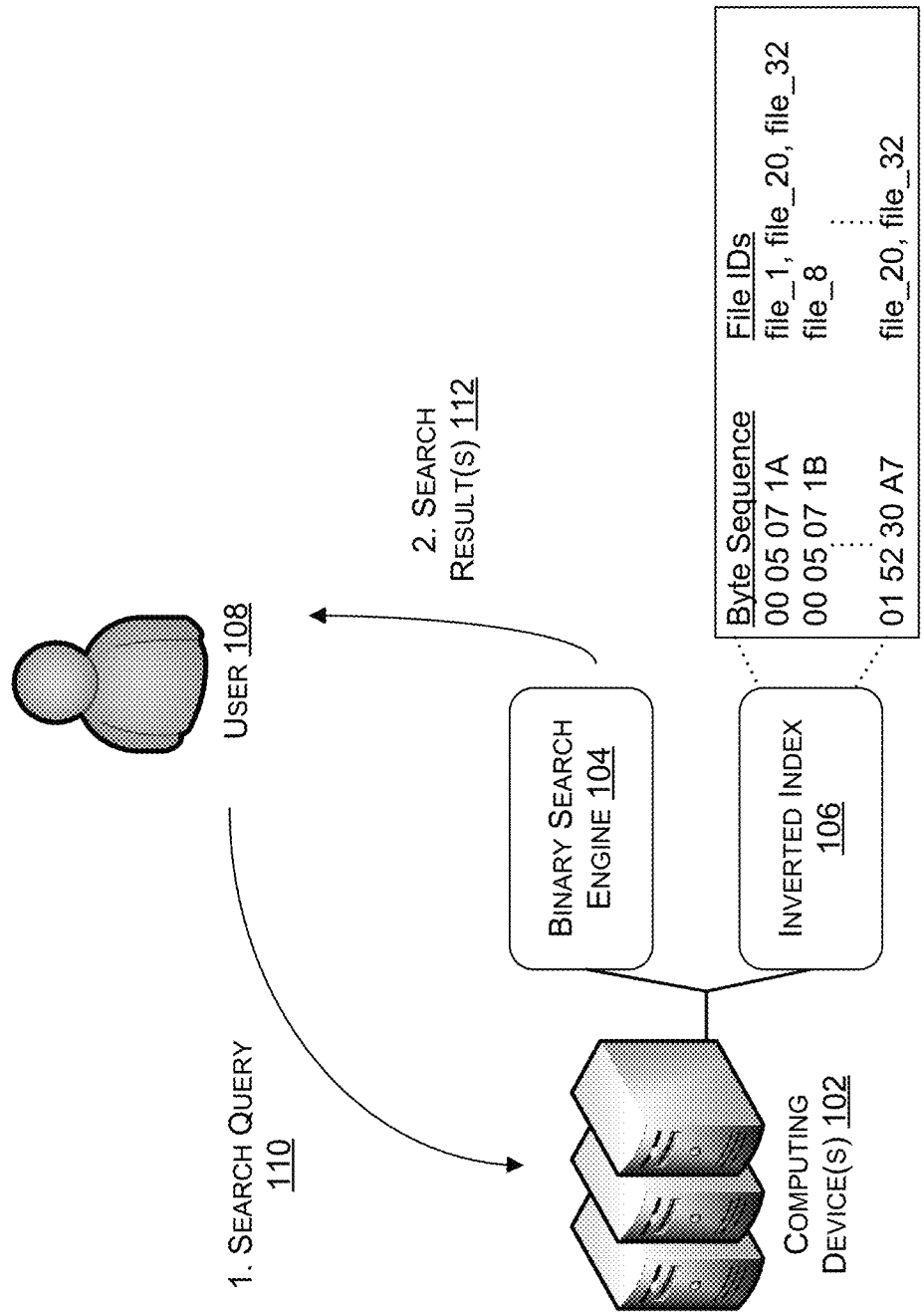
FIGS. 1a-1d illustrate an example overview of computing device(s) configured with a binary search engine and an inverted index that enable searching the contents of binary files and executable files, signature generation, and fuzzy hash generation.

This disclosure describes, in part, techniques for searching an inverted index associating byte sequences of a fixed length and files that contain those byte sequences. Byte sequences comprising a search query are determined and searched in the inverted index, and an intersection of the results is determined and returned as a response to the search query. Further, search queries in the form of expressions including search terms and logical operators are searched in the inverted index and evaluated using a syntax tree constructed based on the logical operators. Also, byte sequences extracted from a file are searched in the inverted index and results of the search are used to generate signatures and fuzzy hashes.

In various implementations, one or more computing devices may generate the inverted index from a corpus of files, such as a corpus of malware files, binary files, executable files, etc. The generating may include specifying at least a subset of byte sequences of the fixed length found in at least one file of the corpus of files and, for each byte sequence in the subset of byte sequences, file identifiers of one or more files in the corpus of files that include that byte sequence. In some implementations, the byte sequences of the fixed length are n-grams with a length of four bytes.

In further implementations, the inverted index may be utilized to generate a signature for a file. For each byte sequence of a fixed length comprising a file, computing device(s) search the inverted index. The inverted index or related data may also specify, for each file identifier, a security status associated with the file of that file identifier. The computing device(s) then create a list of candidate byte sequences based on results of the search in which the candidate byte sequences are only found in files that are associated with a malware status or an unknown status. The computing device(s) select candidate byte sequences that are associated with the most file identifiers and generate a signature from the selected candidate byte sequences.

In some implementations, as noted above, the search query may include an expression, such as an expression including at least two search terms and at least one logical operator. In response to receiving an expression, the computing device(s) may search in the inverted index for each byte sequence of a fixed length that comprises each of the search terms. The computing device(s) then evaluate the results using a syntax tree constructed from the at least one logical operator and return a search result to the search query based on the evaluating.

In various implementations, the computing device(s) may utilize the inverted index to create a fuzzy hash for a file. For each byte sequence of a fixed length comprising a file, the computing device(s) search the inverted index. The computing device(s) then identify a subset of search results that are associated with the fewest file identifiers (but which have more than zero file identifiers) and construct a fuzzy hash from byte sequences comprising the subset. Also, the resulting byte sequences used to construct the fuzzy has may have a different length than the fixed length byte sequences of the inverted index.

Various implementations relate to techniques for searching an inverted index associating byte sequences of a fixed length with files that contain those byte sequences. Byte sequences comprising a search query are determined and searched in the inverted index, and an intersection of the results is determined and returned as a response to the search query. Further, search queries in the form of expressions including search terms and logical operators are searched in the inverted index and evaluated using a syntax tree constructed based on the logical operators. Also, byte sequences comprising a file are searched in the inverted index and results of the search are used to generate signatures and fuzzy hashes.

Example Overview

FIGS. 1a-1d illustrate an example overview of computing device(s) configured with a binary search engine and an inverted index that enable searching the contents of binary files and executable files, signature generation, and fuzzy hash generation.

The computing device(s) 102 illustrated in FIGS. 1a-1d may be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In some implementations, the computing device(s) 102 may represent virtual machines implemented on computing device(s). An example computing device 102 is illustrated in FIG. 2 and described below with reference to that figure.

In various implementations, the computing device(s) 102 may be associated with a security service, a research entity, or may not be associated with any service or entity. As illustrated in FIGS. 1a-1d by the bracket, the computing device(s) 102 may include a binary search engine 104 and an inverted index 106. The inverted index 106 may be constructed from and identify a corpus of files, such as a corpus of malware files obtained by a security service or research efforts. The corpus of files may, however, include any sort of files, such as binary files, executable files, unstructured files, etc. In some implementations, the inverted index may be created by one service or entity and subsequently provided to other service(s) and/or entit(ies).

Additionally, the computing device(s) 102 may comprise a service cluster, a data center, a cloud service, etc., or a part thereof. The binary search engine 104 and the inverted index 106 may each be implemented on single one(s) of the computing device(s) 102, on multiple ones of the computing device(s) 102 (e.g., as multiple instances of the binary search engine 104 or the inverted index 106), distributed among the computing device(s) 102 (e.g., with modules of the binary search engine 104 distributed among the computing device(s) 102 and/or parts of the inverted index 106 distributed among the computing device(s) 102), or any combination thereof. Further, the inverted index 106 may be stored on disk storage of the computing device(s) 102.

In some implementations, the binary search engine 104 illustrated in FIGS. 1a-1d may be configured to accept any sort of query from a user, such as a text/string query, a structured query (e.g., an expression including a logical operator), or a specific byte sequence. The binary search engine 104 may then generate byte sequences of a fixed length from that search query. For example, the binary search engine 104 may identify each possible contiguous byte sequence of a certain length comprising the query. That length may in turn correspond to a fixed length utilized by the inverted index (e.g., a fixed length of four bytes). For example, if the query corresponds to the byte sequence "03 62 D1 34 12 00," the binary search engine 104 may determine the following sequences to be searched: "03 62 D1 34," "62 D1 34 12," and "D1 34 12 00." Upon determining the byte sequences of the fixed length, the binary search engine 104 queries the inverted index 106 for each byte sequence and receives, in return, file identifiers of files that include those byte sequences as file contents. The binary search engine 104 may then take any of a number of further acts described with respect to FIGS. 1a-1d.

In further implementations, either the binary search engine 104 or another component of the computing device(s) 102 may receive a file and determine the byte sequences of the fixed length comprising that file. For example, if the contents of the file are the byte sequence "03 62 D1 34 12 00", the binary search engine 104 or component may determine the following sequences to be searched: "03 62 D1 34", "62 D1 34 12", and "D1 34 12 00". If an additional component performs the receiving and determining, the additional component may then provide the byte sequences to the binary search engine 104. The binary search engine 104 may then query the inverted index 106 for each byte sequence and receive file identifiers in return, as described above. The binary search engine 104 may then take any of a number of further acts described with respect to FIGS. 1a-1d.

In various implementations, the inverted index 106 may specify byte sequences of a fixed length, such as n-gram byte sequences with a fixed length of four bytes (e.g., 4-grams). For each specified byte sequence, the inverted index may also specify one or more file identifiers of files that include that specified byte sequence as file content. FIGS. 1a-1d show an example of such an inverted index 106.

The inverted index 106 may be generated by the binary search engine 104, by another component of the computing device(s) 102, or by other computing device(s) 102. It may be generated or updated periodically from the corpus of files mentioned above. It may also be generated or updated responsive to changes or additions to the corpus of files. To construct the inverted index 106, each byte sequence of the fixed length encountered in one of the files of the corpus of files is added to the byte sequences specified by inverted index 106. Upon encountering a byte sequence, the generating component may determine whether the byte sequence is already specified. If it is specified, the file identifier of the currently processed file is associated with that specified byte sequence. If it is not specified, it is added, and the file identifier of the currently processed file is associated with that added byte sequence.

Figure 2:
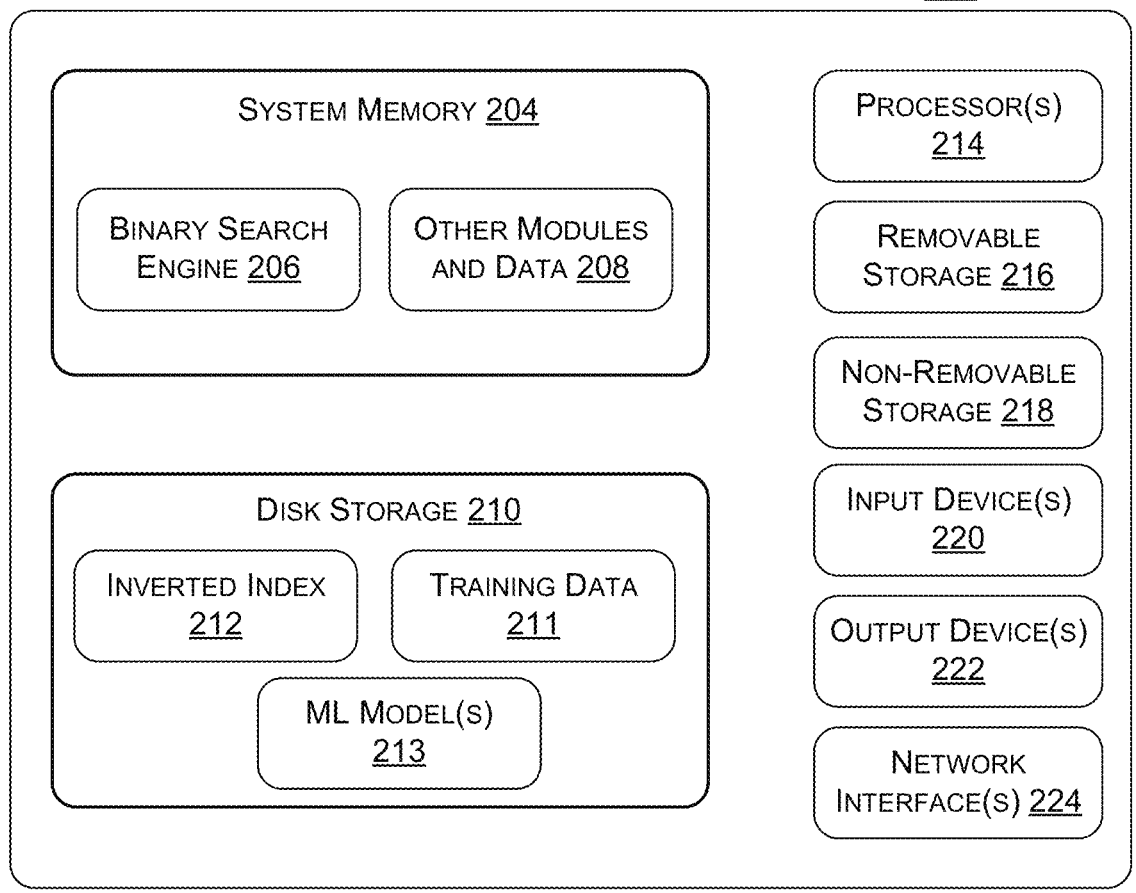
FIG. 2 illustrates a component level view of a computing device configured to implement, in whole or as part of a distributed service, a binary search engine, an inverted index of byte sequences listing files that include those sequences, and other supporting data and logic.

As illustrated in FIG. 1a, the binary search engine 104 of the computing device(s) 102 may receive from a user 108 a search query 110. The binary search engine 104 may then perform search(es) in the inverted index 106, process results, and respond with a search result 112 to the user 108. The search query 110 may be any of the text/string, structured query/expression, or byte sequence described above. The binary search engine 104 may determine the byte sequences of the fixed length corresponding to the search query 110, query the inverted index for each determined byte sequence, and obtain in response the file identifiers associated with those byte sequences, as described above.

In various implementations, upon obtaining the file identifiers associated with the byte sequences for search query 110, the binary search engine 104 determines an intersection of those results. For example, if the binary search engine 104 searches three byte sequences, and if the first sequence is associated with file identifiers 1, 3, and 4, the second sequence associated with file identifiers 1, 2, and 4, and the third sequence associated with file identifiers 1, 4, and 30, the intersection of the results would include file identifiers 1 and 4. The binary search engine 104 would then return indications of the files associated with file identifiers 1 and 4 as the search results 112.

In some implementations, the binary search engine 104 or other component may perform a further validation operation on the files identified by the intersection of the results. For example, files associated with file identifiers 1 and 4 can be evaluated to ensure that they satisfy the search query 110 before indications of those files are returned as search results 112.

Figure 1B:
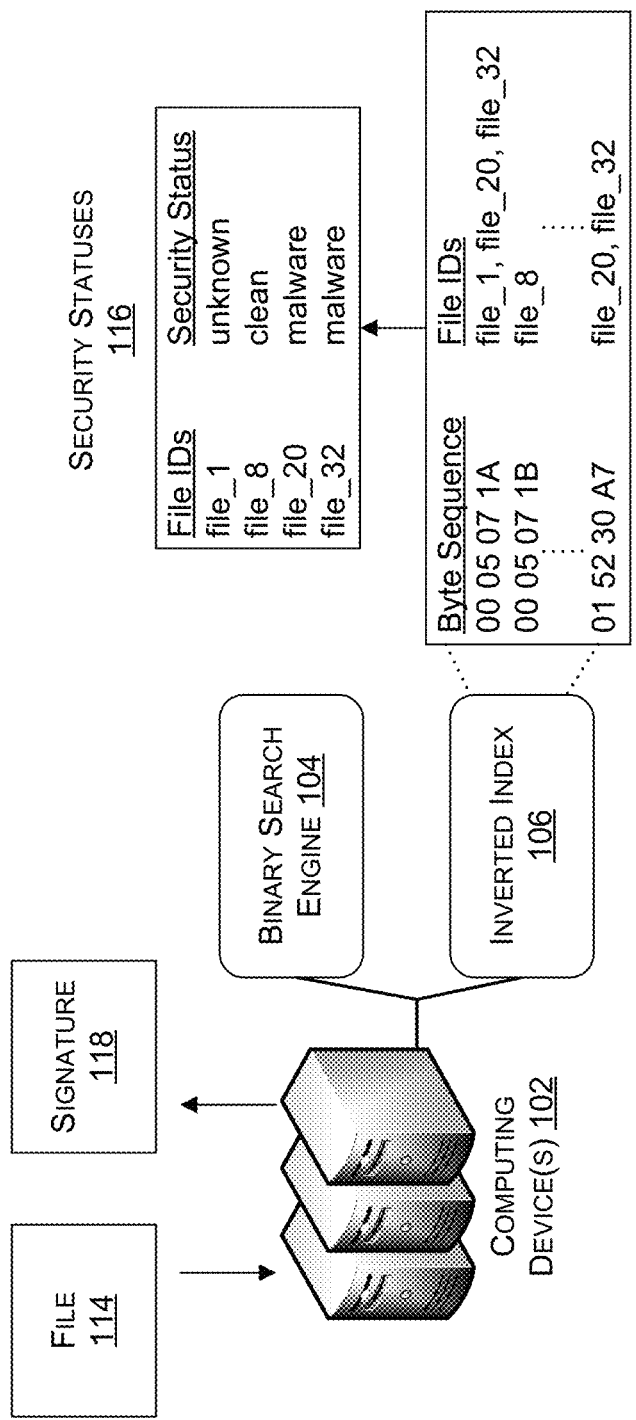

As illustrated in FIG. 1b, computing device(s) 102 may determine the byte sequences of a fixed length comprising a file 114, utilize the binary search engine 104 to search the inverted index 106 for those byte sequences, obtain file identifiers of files including those byte sequences as search results, determine security statuses 116 for those files, identify a subset of the searched byte sequences based on the security statuses 116 and search results, and generate a signature 118 based on the identified byte sequences.

In some implementations, as described above, the binary search engine 104 or another component of the computing device(s) 102 may receive the file 114 and determine the byte sequences of the fixed length comprising that file 114. File 114 may be any sort of file, such as a file of the above-described corpus of files.

Once the byte sequences comprising the file 114 have been determined, the binary search engine 104 searches for each of the byte sequences in the inverted index 106 and receives, as search results, file identifiers associated with each searched byte sequence that is found in the inverted index 106. The binary search engine 104 or another component of the computing device(s) 102 then determines a security status 116 associated with each file identifier. The security statuses 116 may be metadata for the file identifiers and may be found in the inverted index 106 or in another data source. The security status 116 for each file identifier identifies a security status 116 of a file associated with that file identifier. Such a security status 116 may be one of a malware status, a clean status, an unknown status, another status indicating a level of trust.

In further implementations, before searching for each byte sequence comprising the file 114, the binary search engine 104 or other component may filter the byte sequences, removing from the list of byte sequences to be searched any byte sequences known to only be found in files with a clean security status 116. Following the filtering, the binary search engine 104 would proceed with searching the inverted index 106 for the remaining byte sequences.

Following the searches, the binary search engine 104 or other component then creates a list of candidate byte sequences that are only found in files associated with a malware security status 116 or unknown security status 116. If any of the file identifiers associated with a given byte sequence are associated with a clean security status, then that given byte sequence will not be included in the list of candidate byte sequences.

In various implementations, the binary search engine 104 or other component then determines a number of file identifiers associated with each of the candidate byte sequences and selects the top n byte sequences (e.g., top 2 or top 3) with the greatest number of file identifiers. For example, if byte sequence 1 is associated with 10 file identifiers, byte sequence 2 is associated with 1 file identifier, byte sequence 3 is associated with 8 file identifiers, byte sequence 4 is associated with 2 file identifiers, and byte sequence 5 is associated with 1 file identifier, then byte sequences 1 and 3 may be selected.

The binary search engine 104 or other component of the computing device(s) 102 may then generate a signature 118 from the selected ones of the candidate byte sequences and associate that signature 118 with the file 114. In some implementations, the signature 118 may then be shared with a security service to aid in malware detection and analysis.

Figure 1C:
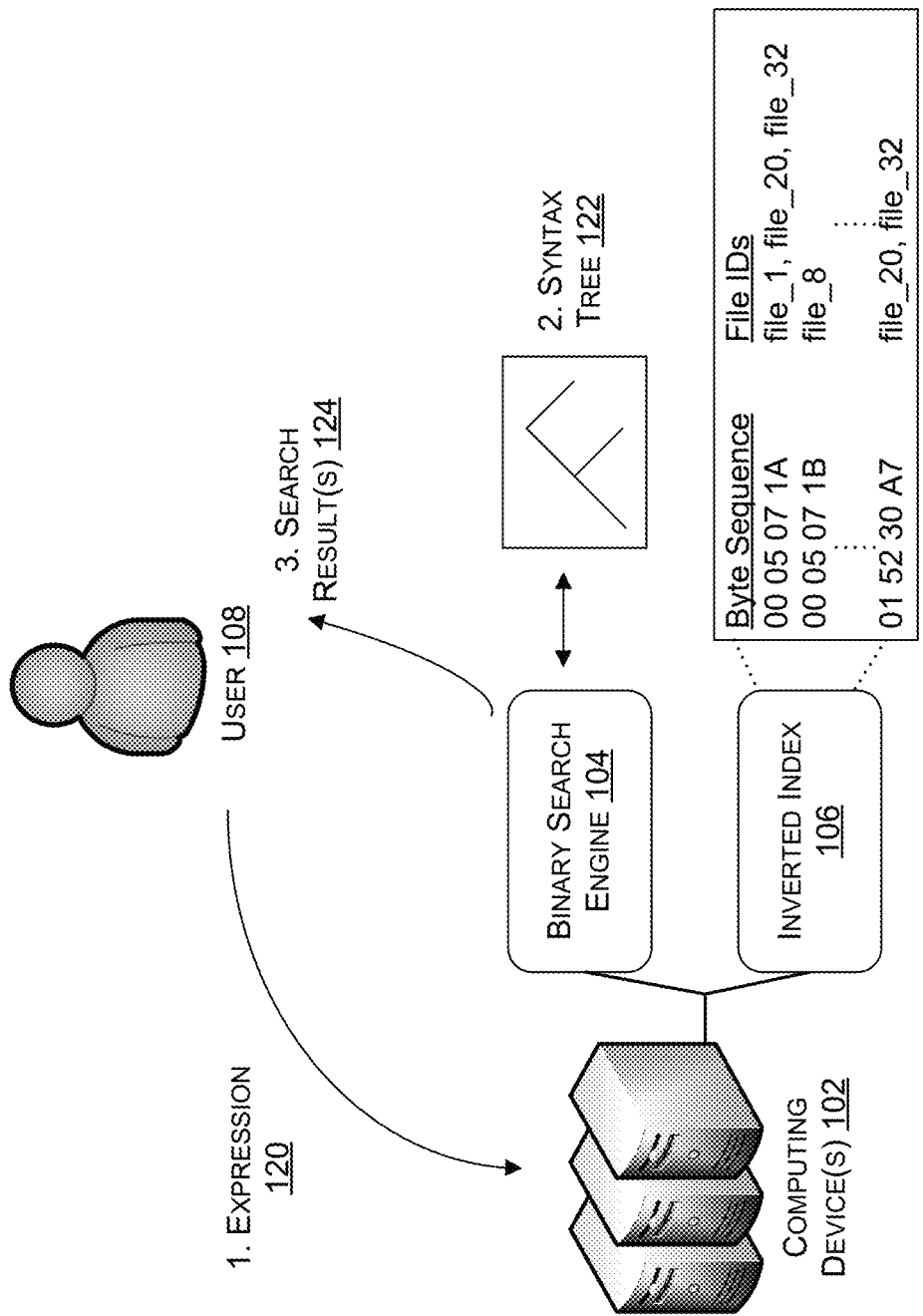

As illustrated in FIG. 1c, the binary search engine 104 of the computing device(s) 102 may receive an expression 120 as a search query from a user 108. The binary search engine 104 may then perform search(es) in the inverted index 106, evaluate the results of the searches using a syntax tree 122 constructed from logical operator(s) included in the expression 120, and respond with a search result 124 to the user 108 based on the evaluating.

The expression 120 may comprise at least two search terms and at least one logical operator. For example, the expression 120 may be something like "includes 'hello' AND 'world.'" In that expression 120, "hello" and "world" are the search terms, and AND is the logical operator. Upon receiving the expression 120, the binary search engine 104 may determine the byte sequences of a fixed length comprising each search term and query the inverted index 106 with those byte sequences.

The binary search engine 104 or another component of the computing device(s) 102 may also construct a syntax tree 122 based on the logical operator(s) included in the expression 120. The search terms of the expression 120 become the leaves of the syntax tree 122.

In various implementations, upon constructing the syntax tree 122 and searching for the byte sequences comprising the search terms, the binary search engine 104 or other component evaluates the results of the searching using the syntax tree 122 to determine search result(s) 124. Those search result(s) 124 are then returned to the user 108.

In some implementations, the binary search engine 104 or other component may perform a validation operation before returning the search result(s) 124 to ensure that each file identified as a search result 124 satisfies the expression 120.

Figure 1D:
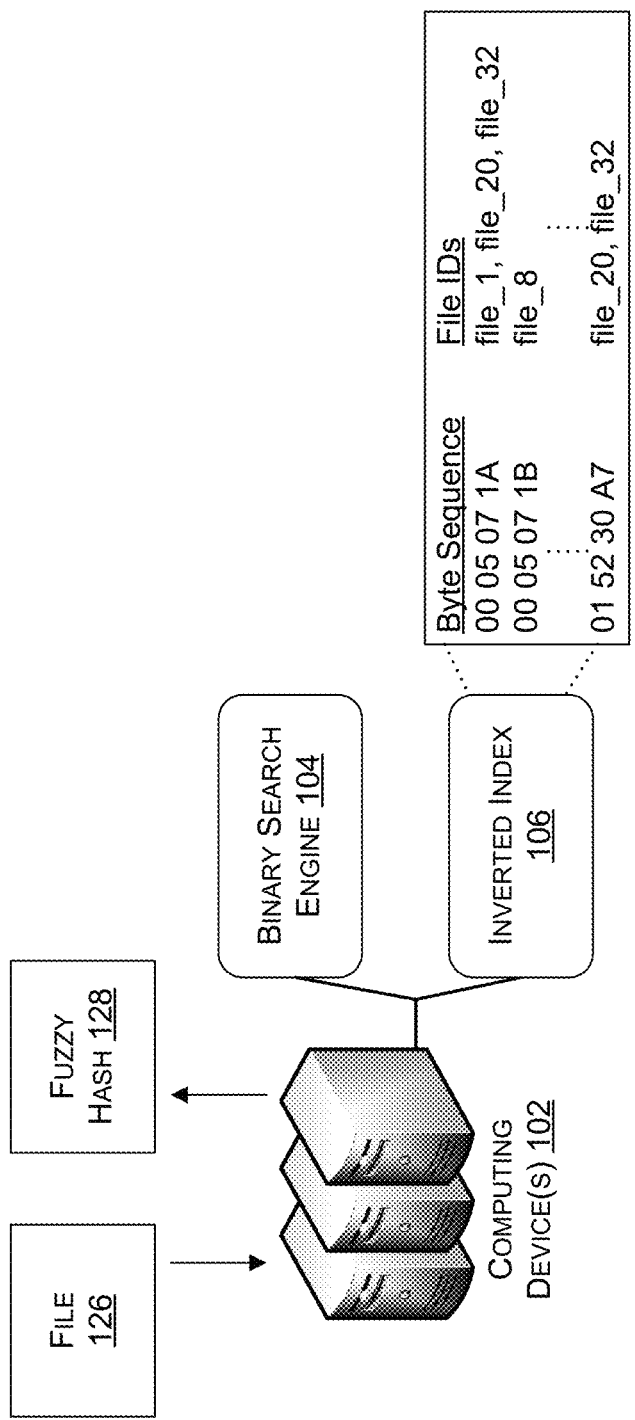

As illustrated in FIG. 1d, computing device(s) may determine the byte sequences comprising a file 126, search for those byte sequences in an inverted index 106 using the binary search engine 104, identify ones of the byte sequences that are associated with the fewest file identifiers, and construct a fuzzy hash 128 from those ones of the byte sequences.

In some implementations, as described above, the binary search engine 104 or another component of the computing device(s) 102 may receive the file 126 and determine the byte sequences of the fixed length comprising that file 126. File 126 may be any sort of file, such as a file of the above-described corpus of files.

Once the byte sequences comprising the file 126 have been determined, the binary search engine 104 searches for each of the byte sequences in the inverted index 106 and receives, as search results, file identifiers associated with each searched byte sequence that is found in the inverted index 106.

In various implementations, the binary search engine 104 or other component then determines a number of file identifiers associated with each of the byte sequences and selects the top n byte sequences (e.g., top 2 or top 3) with the fewest number of file identifiers (but which have more than zero file identifiers). For example, if byte sequence 1 is associated with 10 file identifiers, byte sequence 2 is associated with 1 file identifier, byte sequence 3 is associated with 8 file identifiers, byte sequence 4 is associated with 2 file identifiers, and byte sequence 5 is associated with 1 file identifier, then byte sequences 2 and 5 may be selected. The relatedness confidence threshold used in selecting the top n byte sequences may be determined based on a desired level of confidence that a particular byte sequence is relatively unique for the file in which it appears, appearing in that file and its variants but not in other files.

The selected byte sequences are then used to construct a fuzzy hash 128, which may then be provided to security service(s). Also, the length of the byte sequence used for fuzzy hashing may differ from the fixed length of the byte sequences of the inverted index. For example, the inverted index could use byte sequences with a fixed length of four bytes, but the byte sequences used for fuzzy hashing could be of a length of ten bytes.

Example System

FIG. 2 illustrates a component level view of a computing device configured to implement, in whole or as part of a distributed service, a binary search engine, an inverted index of byte sequences listing files that include those sequences, and other supporting data and logic. As illustrated, computing device 202 comprises a system memory 204 storing a binary search engine 206 and other modules and data 208 as well as disk storage 210 storing an inverted index 212, training data 211, and machine learning (ML) model(s) 213. Also, computing device 202 includes processor(s) 214, a removable storage 216 and non-removable storage 218, input device(s) 220, output device(s) 222, and network interfaces 224.

In various embodiments, system memory 204 is volatile (such as RAM), non-volatile (such as ROM, flash memory, etc.) or some combination of the two. The binary search engine 206 is an example of similarly named components further describe herein. Other modules and data 208 support functionality described further with respect to FIGS. 1-6.

Disk storage 210 may comprise data storage device(s) (removable and/or non-removable) such as, for example, magnetic disks, optical disks, or tape. Such storage device(s) may comprise non-volatile memory (such as ROM, flash memory, etc.). The inverted index 212 is an example of similarly named components further describe herein. While the inverted index 212 is shown as being stored on disk storage 210, it is to be understood that the inverted index 212 may be stored wholly or in part in system memory 204 or in any other sort of memory or storage.

In various examples, the inverted index(s) 212 may be used to create training data 211 from the corpus of files for training one or more machine learning (ML) models 213 (sometimes referred to herein as "machine learning algorithms" 213) to generate ML query rules to predict malware. For example, the system may use the inverted index of n-grams and file names as a pre-featured index into a body of training files for a machine learning algorithm. A feature may correspond to a property of the training data 211. The training data 211 may be created by labeling (tagging) samples of data with features in strings maintained within the inverted index 106 distributed in the computing device(s) 102. The features of the samples of data may also indicate different security statuses 116 (e.g., malware status, clean status, unknown status, etc.) that correspond to different levels of trust. The ML models may determine different weights to apply to different features in the string based on its malware status. In some examples, the ML model prediction logic for a ML generated query may include a "strings" section and a "conditions" section. The "strings" section may include raw features implemented as query rule and the "condition" section may normalize the features using the weights as ML model prediction.

For example, a first sample file of the training data 211 may include data having identified features in strings. The different features with which the samples of data may be weighted may span a spectrum of string sequences. This first sample file may be labeled with a label such as "malware," "clean," or a value, code, or identifier that indicates the trust level of the data in some way. The weight for the features may be adjusted based on its predicted level of correlations to files labeled with malware status. The first trained model 213 may verified with a second set of training data 211 with known malware or clean status. If the confidence level for the first trained model 213 is within an accepted threshold, the first trained model 213 is labeled based on its confidence level. The confidence level may be based in part on the ratio of false positives to total data sample. If the confidence level is not within an accepted threshold the first trained model 213 may be retrained with the false positive data marked accordingly. The ML models may be trained and retrained to create different ML models having different predetermined confidence level (e.g., low, medium, high, etc.).

Because of the amount of data associated with the corpus of files, such as the corpus of malware files obtained by a security service, it is to be appreciated that the training data 211 may be created in an automated fashion (i.e., without human involvement). In some configurations, unsupervised machine learning may be used on raw the corpus of files, which may be possible due to a large corpus of the corpus of files and the pre-featured index in the inverted index 106. In some embodiments, unsupervised machine learning may be used to create the training data 211, in which case, a machine learning model(s) 213 may create the training data 211 as a first stage of learning. In some configurations, semi-supervised learning (e.g., active learning) may be used to create the training data 211. For example, fabricated or "made-up" the corpus of files can be labeled by humans in order to create a set of initial samples of the training data 211, and this set of initial samples can then can be processed by the machine learning model(s) 213, using semi-supervised learning, along with a larger corpus of unlabeled samples of the corpus of files. In this semi-supervised learning scenario, the training data 211 can be augmented with more labeled samples as the machine learning model(s) 213 learn by processing unlabeled or unknown data. Furthermore, information from third party sources (e.g., sources familiar with the current state of the law in terms of data security requirements) may be used to train, and/or periodically retrain the machine learning model(s) 213.

In some configurations, heuristics and similar mechanisms may be used to infer features in strings for the samples of the corpus of files in the process of create the training data 211 in an automated fashion. For instance, identification of a string pattern that appears frequently may be used to automatically create the labeled training data 211.

Machine learning generally involves processing a set of examples (called "training data" 211) in order to train a machine learning model(s) 213. A machine learning model 213, once trained, is a learned mechanism that can receive new data as input and estimate or predict a result as output. For example, a trained machine learning model 213 can comprise a classifier that is tasked with classifying unknown input (e.g., an unknown file) as one of multiple class labels (e.g., labeling the file as malware or clean). In the context of the present disclosure, the unknown input may include, inter alia, file 114 that is, or is requested to be, added to a particular inverted index 106, and the trained machine learning model(s) 213 may be tasked with classifying the unknown input (a subject for classification) as one of multiple class labels. The unknown file 114 may include text, an image(s), a video(s), multimedia, etc. Thus, the trained machine learning model(s) 213 may be configured with text recognition, image recognition, and other functionality to process unknown file 114 with various types of content. The class labels, in this case, may correspond to a classification of the unknown file 114 as a type of data among multiple different types of data corresponding to different security status levels (e.g., malware, clean, etc.).

The machine learning model(s) 213 may represent a single model or an ensemble of base-level machine learning models, and may be implemented as any type of machine learning model 213. For example, suitable machine learning models 213 for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models 213 whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

As mentioned, the output of the machine learning model(s) 213—which processes unknown file 114 as a subject for classification—may include, inter alia, a classification of the unknown file 114 as a type of data among different types of data corresponding to different status indicating levels of trust. The output may include additional information as well, such as an object ID of the data object that includes the "now-classified" file 114, an object name of the data object, and the like. The output of the machine learning model(s) 213 can be provided information to a user 108 and used to identify files containing malware with at a predetermined confidence threshold.

In some embodiments, the processor(s) 214 include a central processing unit (CPU), a graphics processing unit (GPU), or both CPU and GPU, or other processing unit or component known in the art.

Computing device 202 also includes additional data storage devices (removable and/or non-removable) such as, for example, magnetic disks, optical disks, or tape. Such additional storage is illustrated in FIG. 2 by removable storage 216 and non-removable storage 218. Non-transitory computer-readable media may include volatile and nonvolatile, removable and non-removable media implemented in any method or technology for storage of information, such as computer readable instructions, data structures, program modules, or other data. System memory 204, disk storage 210, removable storage 216 and non-removable storage 218 are all examples of non-transitory computer-readable storage media. Non-transitory computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 202. Any such non-transitory computer-readable media may be part of the computing device 202.

Computing device 202 also has input device(s) 220, such as a keyboard, a mouse, a touch-sensitive display, voice input device, etc., and output device(s) 222 such as a display, speakers, a printer, etc. These devices are well known in the art and need not be discussed at length here.

Computing device 202 also contains network interface 224 capable of communicating with other devices over one or more networks, such as those discussed herein.

Example Processes

FIGS. 3-6, 8-10, 12, and 13 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
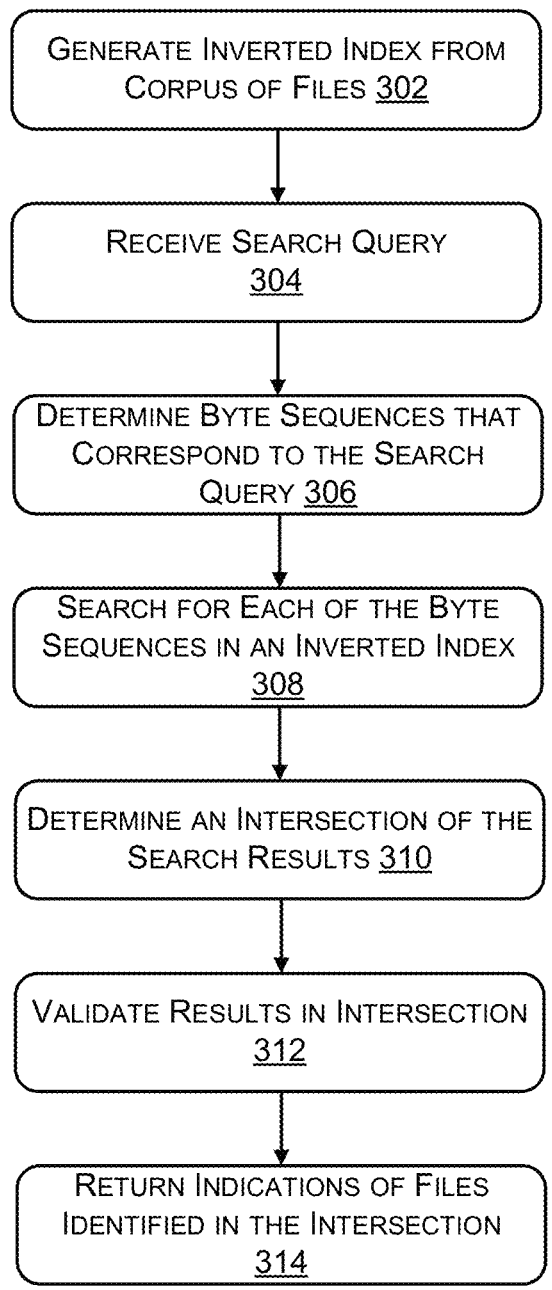
FIG. 3 illustrates example operations associated with the binary search engine, including receiving a search query, searching for byte sequences corresponding to that search query in an inverted index, determining an intersection of the search results, and returning an indication of files identified in the intersection.

FIG. 3 illustrates example operations associated with the binary search engine, including receiving a search query, searching for byte sequences corresponding to that search query in an inverted index, determining an intersection of the search results, and returning an indication of files identified in the intersection.

The operations include, at 302, generating, by a system comprising one or more processors, an inverted index from a corpus of files, such as a corpus of malware files. The files may be binary files or executable files. The generating may include specifying at least a subset of byte sequences of the fixed length found in at least one file of the corpus of files and, for each byte sequence in the subset of byte sequences, file identifiers of one or more files in the corpus of files that include that byte sequence. In some implementations, the byte sequences of the fixed length are n-grams with a length of four bytes. Further, the one or more processors, along with executable instructions for performing the operations shown in FIG. 3, and the inverted index may be distributed across a plurality of computing devices.

At 304, the system may receive a search query.

At 306, the system may determine a plurality of byte sequences of a fixed length that correspond to the search query At 308, the system may search for each of the byte sequences in the inverted index that specifies byte sequences of the fixed length and, for each specified byte sequence, file identifiers of files that include the specified byte sequence.

At 310, the system may determine an intersection of search results of the searching.

At 312, the system may validate that the search results included in the intersection include the search query.

At 314, the system may return indications of files associated with file identifiers that are included in the intersection in response to the search query.

Figure 4:
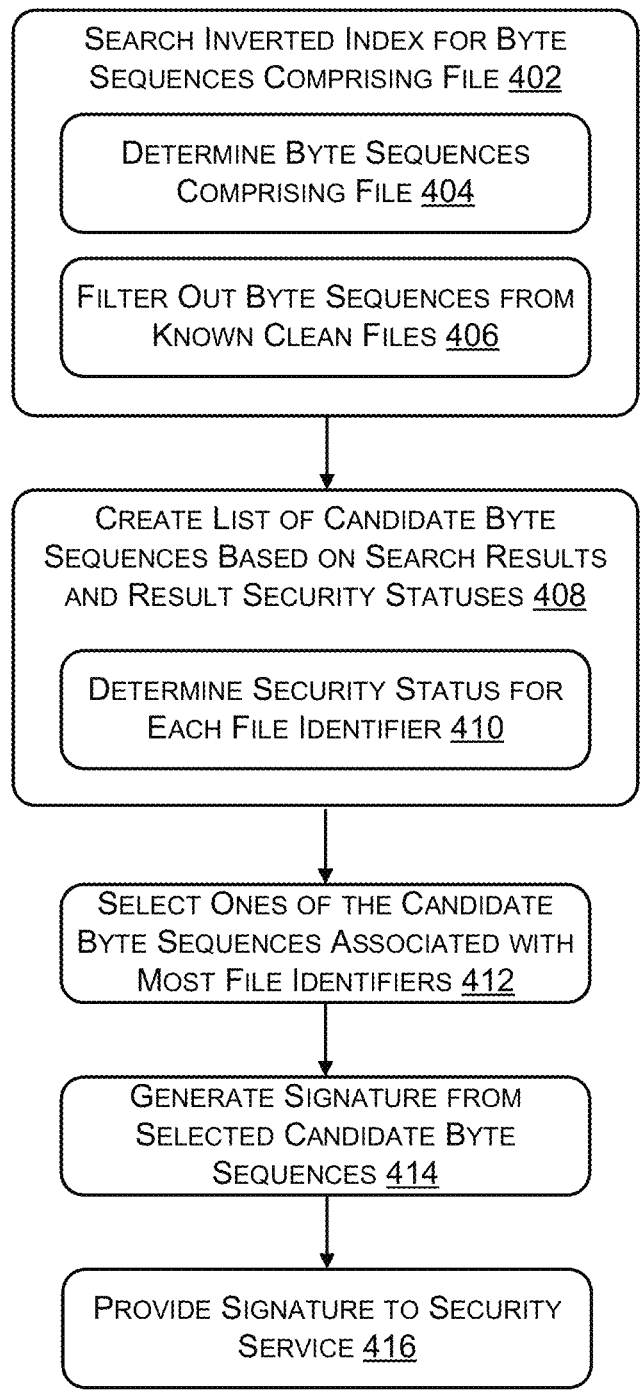
FIG. 4 illustrates example operations associated with the binary search engine, including searching for byte sequences that comprise a file in an inverted index, creating a list of candidate byte sequences from the search results based on security statuses of files associated with those results, selecting candidate byte sequences associated with the most file identifiers, and generating a signature from the candidate byte sequences.

FIG. 4 illustrates example operations associated with the binary search engine, including searching for byte sequences that comprise a file in an inverted index, creating a list of candidate byte sequences from the search results based on security statuses of files associated with those results, selecting candidate byte sequences associated with the most file identifiers, and generating a signature from the candidate byte sequences.

The operations include, at 402, for each byte sequence of a fixed length comprising a file, searching an inverted index which specifies byte sequences of the fixed length and, for each specified byte sequence, file identifiers of files that include the specified byte sequence. In some implementations, the byte sequences of the fixed length are n-grams with a length of four bytes. Further, each file identifier may be associated with a security status. For example, the security status associated with each file identifier may be one of a malware status, a clean status, an unknown status, or another status indicating a level of trust. At 404, the searching also includes determining the byte sequences of the fixed length comprising the file. At 406, the searching further includes filtering out byte sequences known to be found in files with file identifiers associated with a clean status and searching for the remaining byte sequences comprising the file.

At 408, the operations further include, based on results of the searching, creating a list of candidate byte sequences, wherein the candidate byte sequences are only found in files with file identifiers that are associated with a malware status or an unknown status. At 410, the creating may also include determining a security status for each file identifier returned from the searching, the security status being metadata for the file identifier.

At 412, the operations include selecting ones of the candidate byte sequences that are associated with the most file identifiers.

At 414, the operations additionally include generating a signature from selected ones of the candidate byte sequences.

At 416, the operations include providing the signature to a security service.

Figure 5:
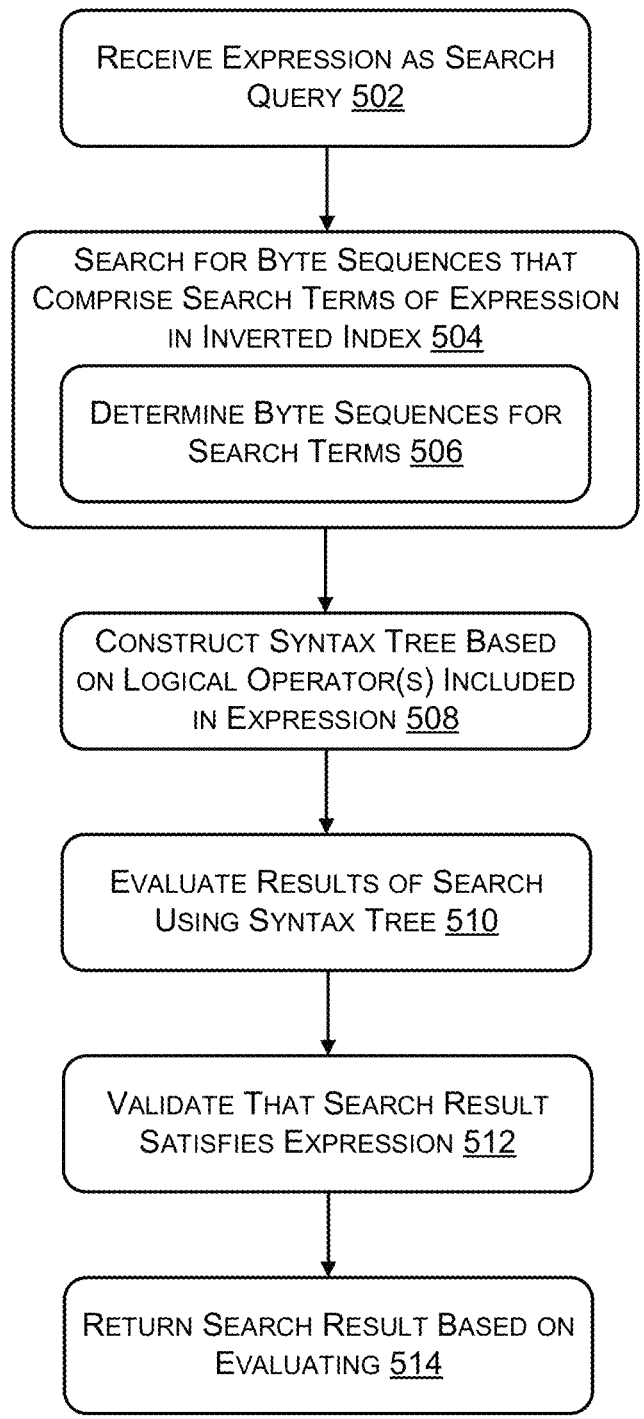
FIG. 5 illustrates example operations associated with the binary search engine, including receiving an expression as a search query, searching for byte sequences corresponding to search terms of the expression in an inverted index, evaluating the search results using a syntax tree constructed from logical operator(s) included in the expression, and returning a search result based on the evaluation.

FIG. 5 illustrates example operations associated with the binary search engine, including receiving an expression as a search query, searching for byte sequences corresponding to search terms of the expression in an inverted index, evaluating the search results using a syntax tree constructed from logical operator(s) included in the expression, and returning a search result based on the evaluating.

The operations include, at 502, receiving an expression as a search query. The expression includes at least one logical operator and at least two search terms.

At 504, the operations further include searching for byte sequences of a fixed length that comprise each of the search terms in an inverted index. The inverted index specifies byte sequences of the fixed length and, for each specified byte sequence, file identifiers of files that include the specified byte sequence. In some implementations, the byte sequences of the fixed length are n-grams with a length of four bytes. At 506, the searching may also include determining a plurality of byte sequences of a fixed length that correspond to each search term.

At 508, the operations include constructing a syntax tree based on the at least one logical operator. The search terms are evaluated as leaves of the syntax tree, each leaf comprising one or more byte sequences associated with one of the search terms.

At 510, the operations additionally include evaluating results of the searching using the syntax tree constructed from the at least one logical operator.

At 512, the operations include validating that a file corresponding to a search result satisfies the expression.

At 514, the operations also include returning the search result to the search query based at least in part on the evaluating.

Figure 6:
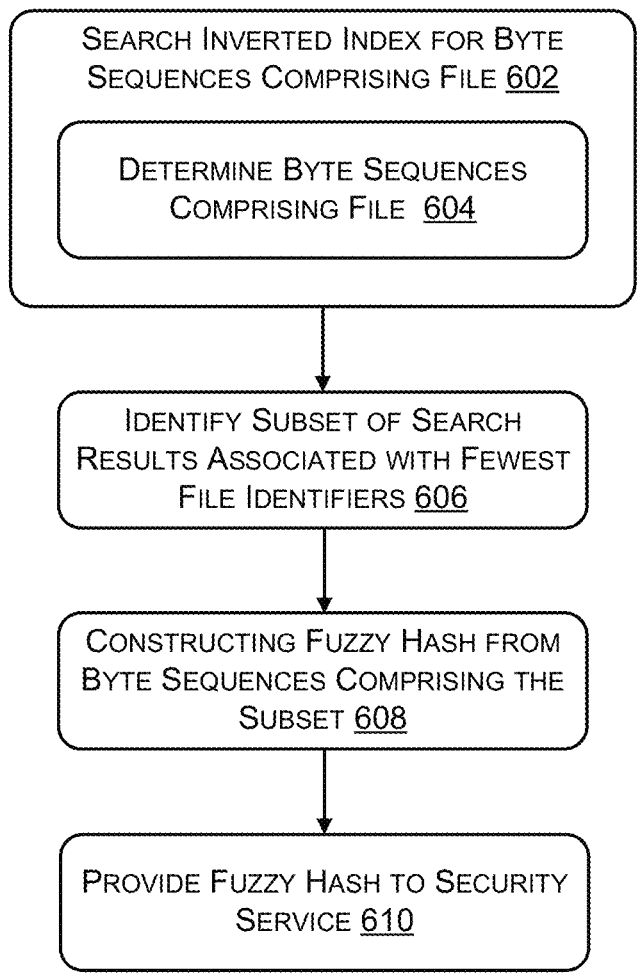
FIG. 6 illustrates example operations associated with the binary search engine, including searching for byte sequences that comprise a file in an inverted index, identifying a subset of the search results associated with the fewest file identifiers, and constructing a fuzzy hash from the byte sequences comprising the subset.

FIG. 6 illustrates example operations associated with the binary search engine, including searching for byte sequences that comprise a file in an inverted index, identifying a subset of the search results associated with the fewest file identifiers, and constructing a fuzzy hash from the byte sequences comprising the subset.

The operations include, at 602, for each byte sequence of a fixed length comprising a file, searching by one or more processors an inverted index which specifies byte sequences of the fixed length and, for each specified byte sequence, file identifiers of files that include the specified byte sequence. In some implementations, the byte sequences of the fixed length are n-grams with a length of four bytes. At 604, the searching also includes determining the byte sequences of the fixed length comprising the file.

At 606, the one or more processors identify a subset of search results of the searching that are associated with the fewest file identifiers. The identifying may be based at least in part on a relatedness confidence threshold.

At 608, the one or more processors construct a fuzzy hash from byte sequences comprising the subset of the search results.

At 610, the one or more processors provide the fuzzy hash to a security service.

Further Illustrative Examples

Figure 7A:
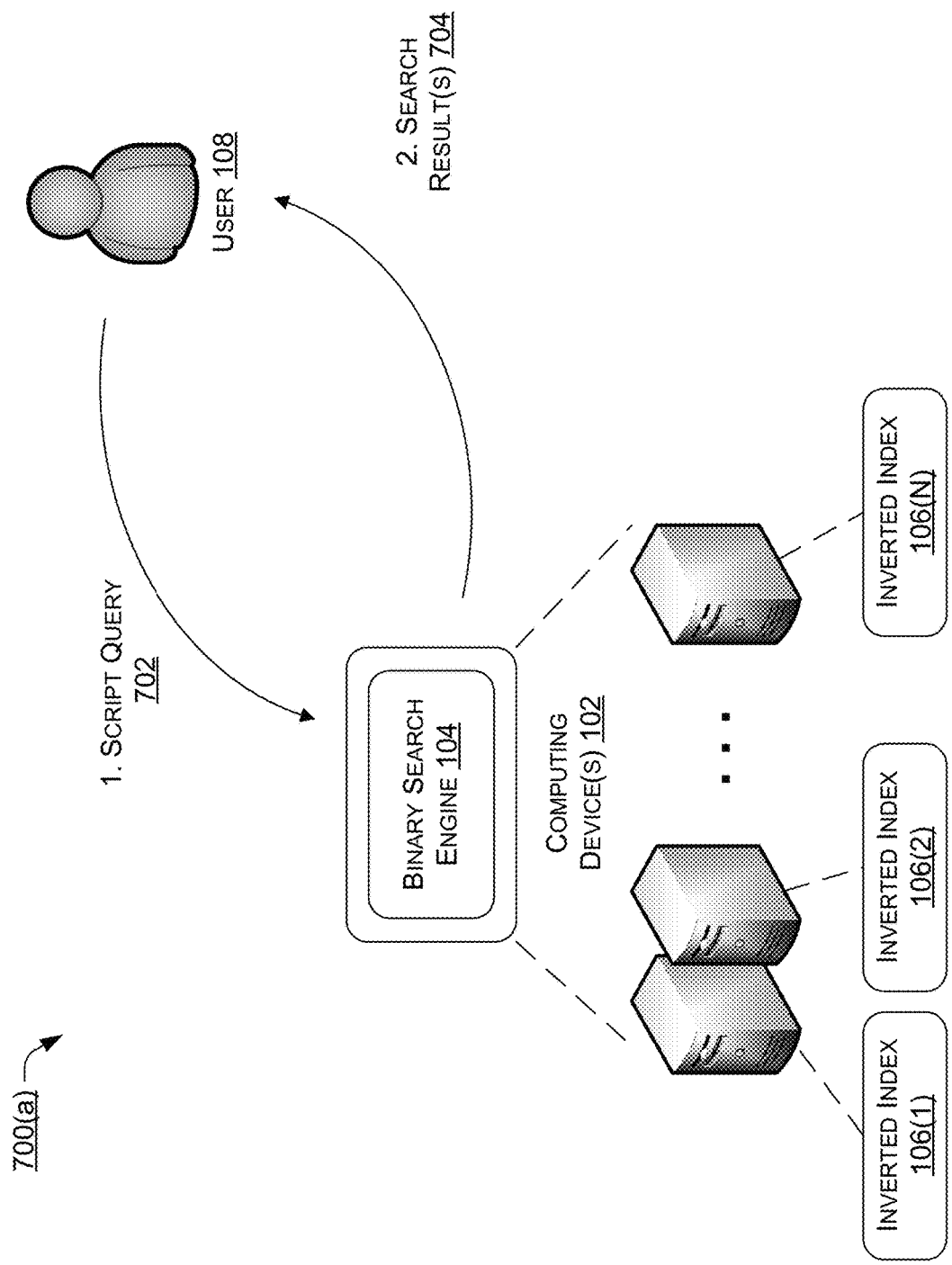
FIG. 7a illustrates an example system of computing device(s) configured with a binary search engine and an inverted index that may search the contents of binary files including searching with a query language as the search expression.
Figure 7B:
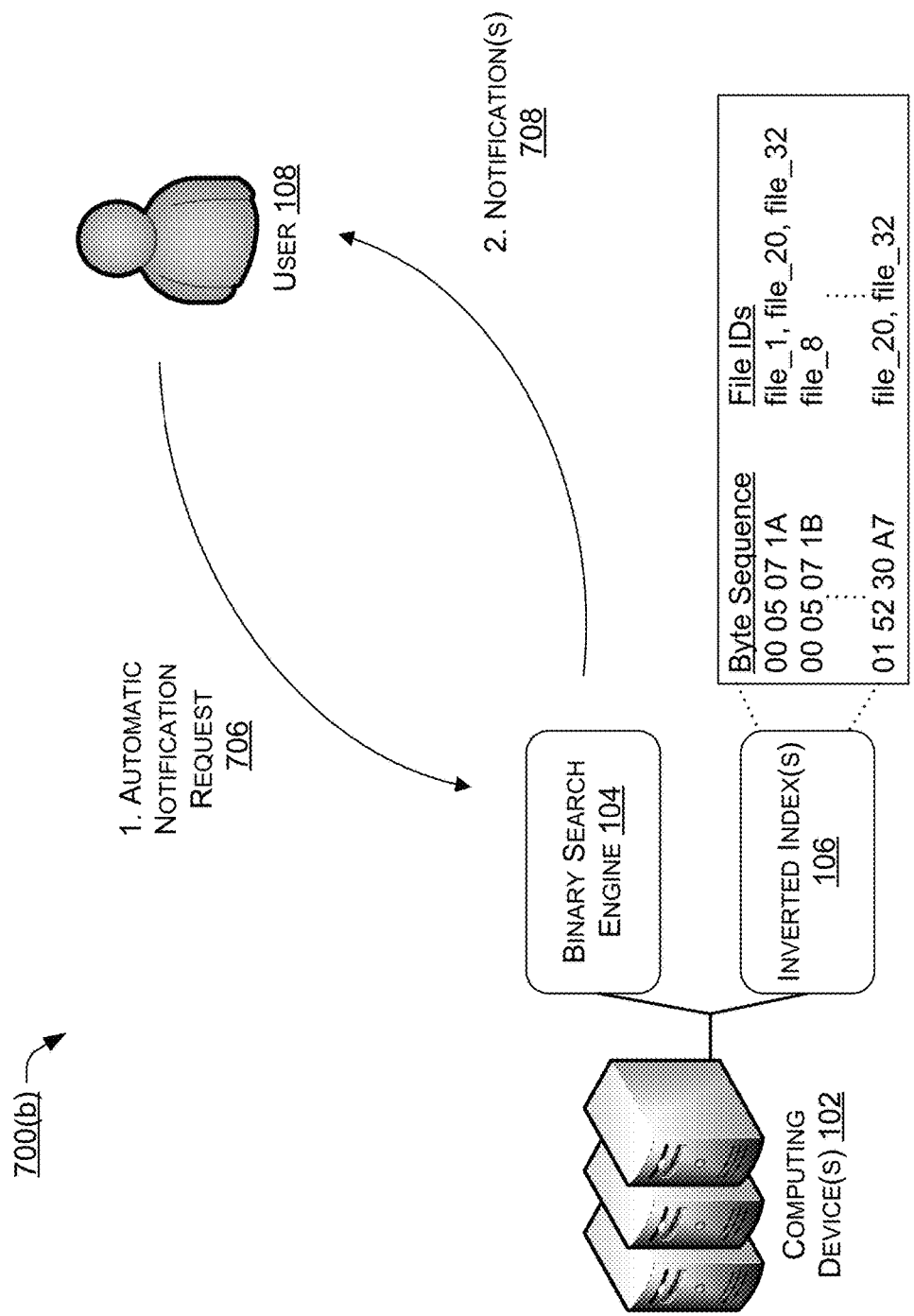
FIG. 7b illustrates an example system of computing device(s) configured with a binary search engine and an inverted index that may search the contents of binary files in response to receiving an automatic notification request.

FIGS. 7a and 7b illustrates an example system 700(*a*) and example system 700(*b*), collectively referred herein with reference 700, that may include one or more computing device(s) 102 configured with a binary search engine 104 and an inverted index 106 that enable searching the contents of binary files, e.g., executable files. Some examples include searching using query language in the search expression. Additional examples include distributing the inverted index 106 across multiple computing devices 102. Some examples include searching in response to an automatic notification request.

As described above with respect to FIGS. 1a-1d, the binary search engine 104 and the inverted index(s) 106 may each be distributed among the computing device(s) 102 with modules of the binary search engine 104 distributed among the computing device(s) 102 and/or parts of the inverted index(s) 106 distributed among the computing device(s) 102. As illustrated in example system 700(*a*), the parts of the inverted index(s) 106 distributed among the computing device(s) 102 may include inverted index(s) 106(1)-106(N) (individually and/or collectively referred to herein with reference 106), where N is any integer greater than and/or equal to 2. For example, a first portion of the inverted index may be distributed on a first computing device, and the remaining portion of the inverted index may be distributed on a second computing device. In various implementations, the computing device(s) 102 running the binary search engine 104 may search the distributed inverted index(s) 106(1)-106(N) in parallel to reduce search time. For example, a first computing device 102(1) may be storing distributed inverted index 106(1), while a second computing device 102(2) may be storing distributed inverted index 106(2), and the search may be running on both first computing device 102(1) and second computing device 102(2) in parallel. The algorithm complexity of running the binary search engine 104 in parallel for computing device(s) 102 having the distributed inverted index(s) 106 is O(1), while a traditional search through a collection of files is O(n). Due to the algorithm complexity being O(1), the performance of running binary search engine 104 in parallel on computing devices 102 with distributed inverted index(s) 106 does not depend on the amount of data that is indexed.

In various implementations, the distribution of the portions of inverted index(s) 106 across the computing device(s) 102 may be determined based on one or more distribution scheme including maximum data size per device or time-frame. For example, a distribution scheme based on maximum data size may distribute a first portion of the inverted index up to a predetermine data threshold on a first computing device, then distributing the next portion of the inverted index to the next computing device until the remaining portion(s) of the inverted index is distributed to a last computing device. The predetermined data threshold may be determined based on a hardware limitation or a search efficiency or a combination of the two. Under the maximum data size scheme, new additions to the inverted index may be added to the final computing device up to the predetermined data size, at which point, a new computing device may be added to receive new additions. In an additional example, a distribution scheme based on time-frame may distribute inverted index generated for files received during a first time frame on a first device and then distribute inverted index generated for files received during a second time frame on a second device.

Also described above with respect to FIGS. 1a-1d, the binary search engine 104 may be configured to accept any sort of query from a user, including, but not limited to, text/string query, structured query, and specific byte sequence query. In additional implementations, the binary search engine 104 or another component of the computing device(s) 102 may receive query 702 as a search expression from user 108. The query 702 may include one or more of: at least one rule; conditional search language; or at least one pattern-matching expression. Pattern-matching expressions can be expressed in a language corresponding to one or more query languages and/or regular-expression variants. The query languages or regular-expression variants may include languages that are specific to certain search tools, which may be defined by the tools' programmers, or that are general-purpose query languages, such as PCRE or XPath. The conditional search language may include one or more of: rules, conditional strings, Boolean operators, relational operators, nested statements, or "if" statements. The binary search engine 104 or component may be configured to interpret the conditional search language. For example, the binary search engine 104 may receive "or" or "|" as part of a search query, and may recognize both to be conditional "or." In another example, the binary search engine 104 or component may receive nested conditional search 'black' and 'white' and 'hat' and not 'striped' as a search query, and may interpret the search as looking for files containing "black" and "white" and "hat" but not "striped."

In some implementations, the binary search engine 104 or another component of the computing device(s) 102 may be configured to support one or more anti-malware analyzing tools. Such malware-analyzing tools may or may not be developed by the same party as search tools described herein. Example malware-analyzing tools may include rules-based searching with custom malware signature. For example, the binary search engine or component may support malware scanning tools such as YARA or ClamAV, and may further recognize the language used by the tools such regular expressions, logical operators, substring-length or -position operators, set-membership operators, string-count operators, or operators for indexing into the contents a file, e.g., by the byte, word, dword, or other unit. Such support for scanning tools may be determined by and change according to community standards for sharing malware signature rules.

Accordingly, in various implementations, the binary search engine 104 or component may receive a search expression including a regular expression that defines a search pattern. The regular expression may include regular characters, with literal meaning, and metacharacters, with special meaning that may indicate a specific function based on the query language. For example, the metacharacters may include characters defining specific pattern matching syntax, quantifiers, conditions, grouping, wildcards, constants, sets of strings, and operator symbols, which denote operations over these sets. As a non-limiting example, if the binary search engine 104 or component receives "/ab(cd){2}/" as a search query, and the binary search engine 104 or component may process the "/" as a metacharacter indicating the beginning and the end of a regular expression; "( )" indicating a grouping; and "{2}" as matching exactly two times. The binary search engine 104 or component can therefore interpret the search query as searching for the term "abcdcd." In another example, if the binary search engine 104 or component receives "/hello (the|one) world/" as a search query, the binary search engine 104 or component may interpret the search query as having two search terms of "hello the world" and "hello one world," with an "or" conditional operator between those two search terms.

Additionally, the binary search engine 104 or component may receive and process the query 702 into one or more search terms and identify any conditional operator(s) that may be incorporated. After the query 702 has been processed as one or more search terms, the binary search engine 104 or component may then generate byte sequences of a fixed length from the search terms and may apply any conditional operator(s) that was identified. Additionally, as described above, with reference to syntax tree 122 or FIG. 1c, the binary search engine 104 or component may construct a syntax tree 122 based on any logical operator(s) identified. In some implementations, the binary search engine 104 or component may perform a validation operation before returning the search result(s) 704 to ensure that each file identified as a search result 704 satisfies the query 702. Furthermore, the binary search engine 104 may then take any of a number of further acts described with respect to FIGS. 1a-1d.

In various implementations, as illustrated in the example system 700(*b*), the binary search engine 104 or another component of the computing device(s) 102 may receive an automatic notification request 706 for a search query from user 108. The search query included with the automatic notification request 706 may be any query including but not limited to a text/string query, a structured query, a query for a specific byte sequence, or a query containing search rules as described for the query 702 illustrated in the example system 700(*a*). The automatic notification request 706 may include default settings for frequency of notification reporting and communication method for the notification.

In some implementations, the binary search engine 104 or component may receive additional input from user 108 specifying a frequency of notification reporting. The binary search engine 104 or component may have a default frequency setting and the user may elect to change the frequency setting. The frequency of notification reporting may be based on time including hourly, daily, weekly, bi-weekly, and monthly, or may be based on conditions including indexing one or more new files containing the search terms. For example, a weekly notification report may generate a report every week regardless if a new file was identified, while a conditional report may generate a report only in weeks in which a new file intersecting with the search query is found. In some implementations, e.g., if the frequency of notification reporting is based on a time longer than a day, the binary search engine 104 or component may trigger the search at night, or another suitable low traffic hour or low-load period, before reporting is due. If the frequency of notification reporting is based a condition such as indexing a new file, the binary search engine 104 or component may trigger the search after a new file has been processed and added to the inverted index. In additional implementations, if no new files have been added to the inverted index since the report was last generated, the search process may be skipped until the next reporting cycle. In various implementations, the reporting frequency may combine the condition of identifying a file with the search terms and reporting nightly, thus sending a report at a certain time based on positive search hits.

In additional implementations, the binary search engine 104 or another component of the computing device(s) 102 may receive additional input from user 108 specifying a method of communication for the notification or alert. Initially, the binary search engine 104 or other component may use the default communication setting that the user has already elected for current communication as the communication method for sending the notification 708. The binary search engine 104 or component may receive input from the user to change or set the communication method for the alert(s) or notification(s) 708. As a non-limiting example, the communication methods may utilize any communication channel, including one or more of an e-mail message, a website associated with a service provider, a text message, a push notification, a social network site, or an application that is associated with a service provider and is residing on a client device. In various implementations, more than one automatic notification request for the same user may be compiled into a single notification feed, and that notification feed can be pushed to the user as described above.

Figure 8:
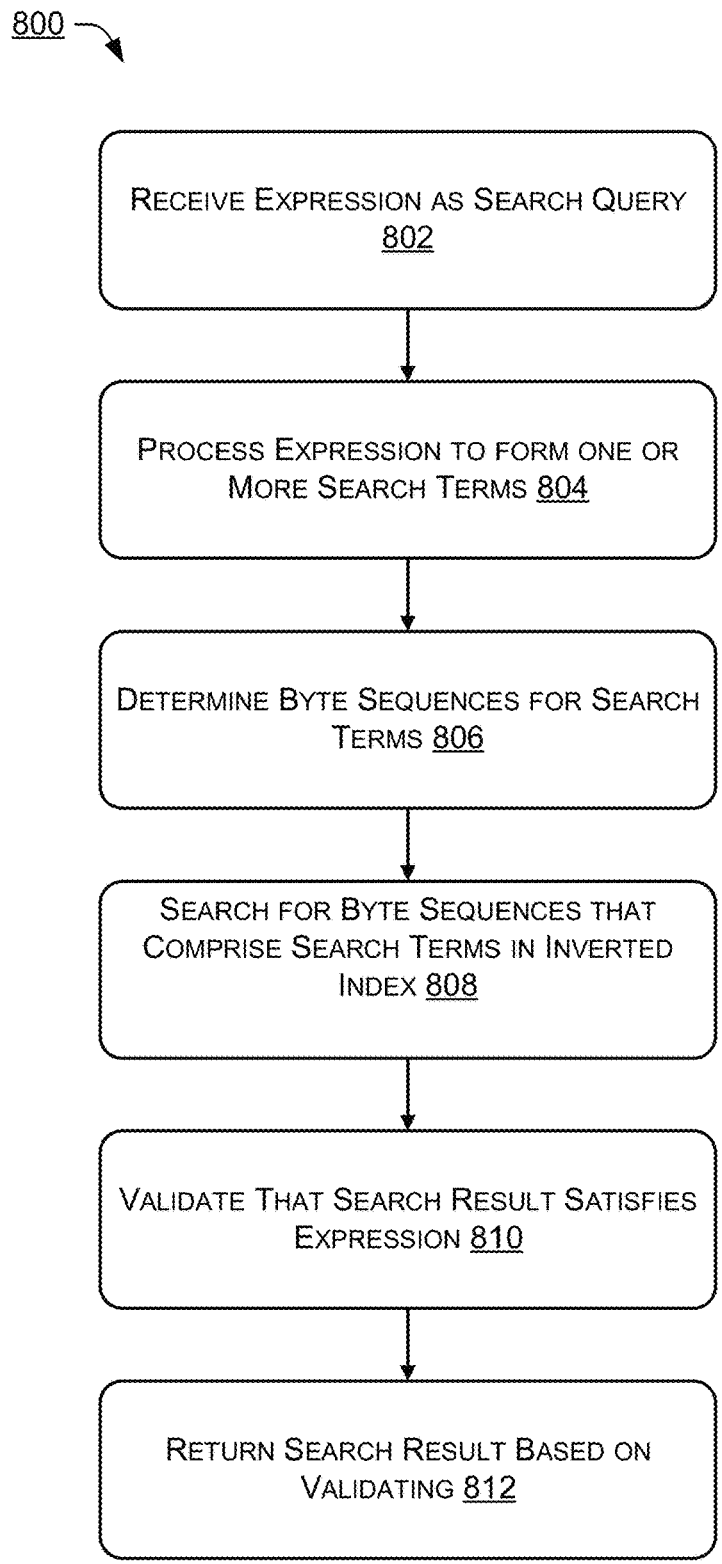
FIG. 8 is a flow diagram of an illustrative process associated with the binary search engine, including searching for byte sequences.
Figure 9:
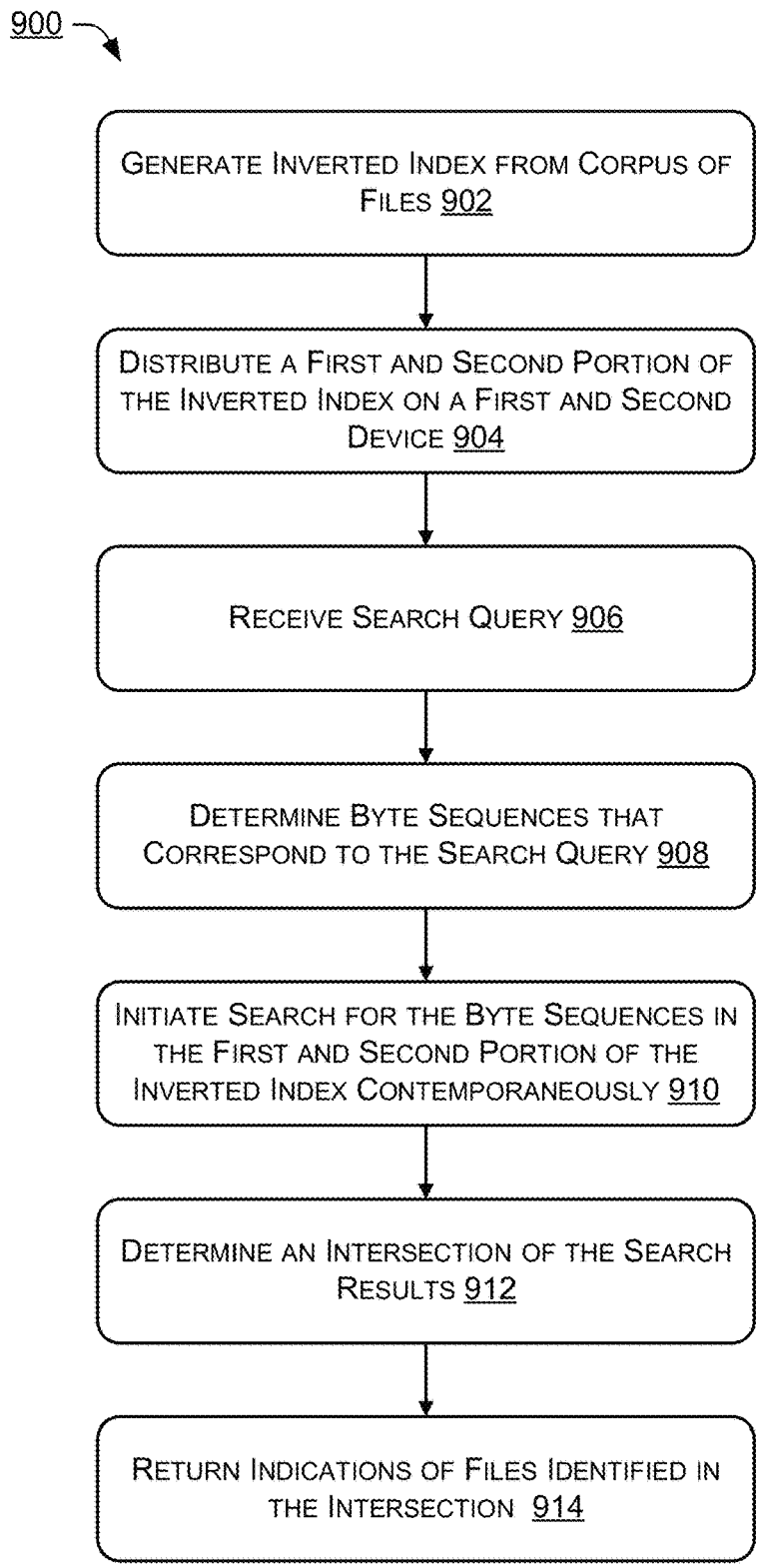
FIG. 9 is a flow diagram of an illustrative process associated with the binary search engine, including distributing portions of an inverted index to multiple devices and searching for byte sequences.
Figure 10:
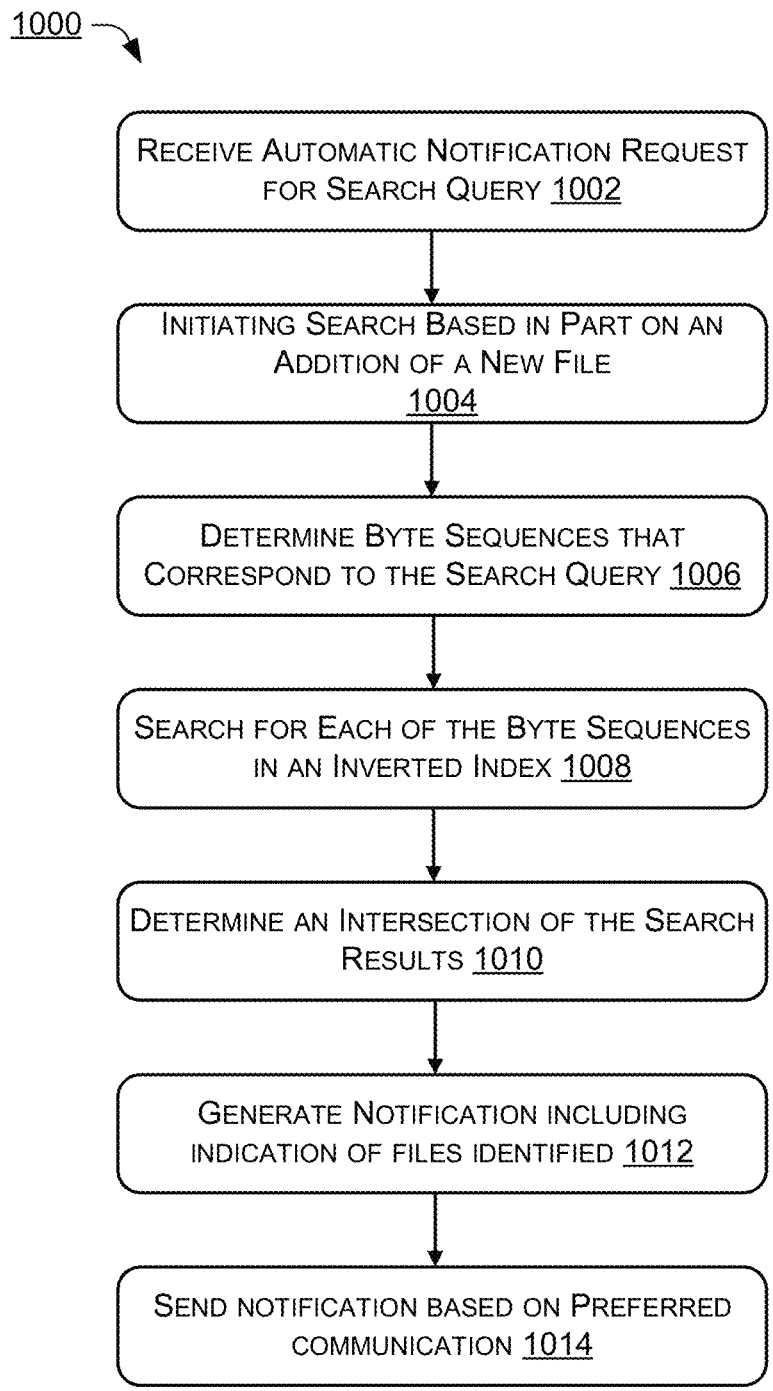
FIG. 10 is a flow diagram of an illustrative process associated with the binary search engine, including receiving an automatic notification request for a search query and searching for byte sequences that correspond to the search query.

In some examples, the processes of FIGS. 8-10 are implemented using computing device(s) 102 or 202, e.g., as discussed herein with reference to FIG. 1a-2, 7a, or 7b, and example system 700. For example, the described operations can be carried out by processor(s) 214 under control of computer-executable instructions in system memory 204.

FIG. 8 is a flow diagram of an illustrative process 800 associated with the binary search engine, including receiving an expression as a search query, interpreting the expression into one or more search terms, searching for byte sequences corresponding to one or more search terms of the expression in an inverted index, evaluating the search results, and returning a search result based on the evaluation.

The operations include, at 802, receiving, by a system comprising one or more processors, an expression as a search query. The system may receive the search query on any communication interface presented to a user, including but not limited to a web interface or application console associated with a service provider. The expression may include one or more of scripting commands, rules, conditional search language, and pattern matching language corresponding to one or more programming language and/or regular expression.

At 804, the system may process expressions into one or more search terms. As described above with respect to the example system 700, the binary search engine 104 or another component of the computing device(s) 102 may determine if the expression includes query language or metacharacters, and may process the expression into one or more search terms according to the query language(s), regular expression(s), or other expression format(s) supported by the system. The system may also interpret conditional search language or search rules and apply any condition that may apply before conducting a search. The system may apply any conditional search language or search rules after searching for all the search terms.

At 806, the system may determine a plurality of byte sequences of a fixed length that correspond to the search terms. The process of determining the plurality of byte sequence is as described above, reference to FIGS. 1*a*-1*d* and 3.

At 808, the system may search for byte sequences that comprise interpreted search terms in inverted index. The process for searching is as described above, reference to FIGS. 1*a*-1*d* and 3.

At 810, the system may validate that the search results included in the intersection include the expression. In various examples, after identifying the files, the system may retrieve the file and verify that that the search terms were in the file. The process for validating is as described above, reference to FIGS. 1*a*-1*d* and 3.

At 812, the system may return those of the search results that were validated at 810 as including the expression. For example, the search results can be transmitted via a network, or presented via a user interface.

FIG. 9 is a flow diagram of an illustrative process 900 associated with the binary search engine, including distributing portions of an inverted index to multiple devices, receiving a search query, searching for byte sequences corresponding to the search query in the distributed inverted indices in parallel across the multiple devices, evaluating the search results, and returning a search result based on the evaluation.

At 902, the binary search engine 104 or another component of the computing device(s) 102 may generate an inverted index from a corpus of files, such as a corpus of malware files. The process for generating an inverted index is as described above, reference to FIGS. 1*a*-1*d* and 3. The binary search engine 104 or component can index any kind of binary files: documents, executables, images, etc. The generating may include operations of specifying byte sequences or file identifiers, such as operations described above for those purposes. In some implementations, the byte sequences of the fixed length are n-grams with a length of four bytes.

At 904, the binary search engine 104 or component may distribute a first portion of the inverted index on a first computing device and a remaining portion on a second computing device. As described above with respect to example system 700, the binary search engine 104 or components may distribute the inverted index according to one or more distribution schemes including a maximum data size per device or time-frame. For example, a distribution scheme based on maximum data size may distribute a first portion of the inverted index up to a predetermine data threshold on a first computing device, then distributing the next portion of the inverted index to the next computing device until the remaining portion(s) of the inverted index is distributed to a last computing device. The predetermine data threshold may be determined based on a hardware limitation or search efficiency or a combination of the two. In an additional example, a distribution scheme based on time-frame may distribute a first portion of the inverted index generated during a first time-frame on a first computing device, then distributing a second portion of the inverted index generated during a second time-frame to the second computing device, and so on.

At 906, the binary search engine 104 or component may receive a search query. The search query may be received on any communication interface presented to a user, including but not limited to a web interface or application console associated with a service provider. The search query may be any form of query including any combination of query as described above with respect to example system 700, such as query languages, rules, and conditions.

At 908, the binary search engine 104 or component may determine a plurality of byte sequences of a fixed length that correspond to the search query. The process for determining byte sequences is as described above, reference to FIGS. 1*a*-1*d* and 3.

At 910, the binary search engine 104 or component may conduct search on the first and second computing device, e.g., in series or contemporaneously, for the byte sequences in the first and second portion of the inverted index. For example, the binary search engine 104 or component may, in order: initiate search on the first computing device; initiate search in the second computing device; receive search results from one of the first computing device and the second computing device; and receive search results from the other of the first computing device and the second computing device. Additionally, and/or alternatively, the binary search engine 104 or component may initiate search on the first and second computing devices substantially contemporaneously, and receive results from the first and second computing devices at a time after the initiation of search on both computing devices. The search on each machine may be conducted as discussed herein with reference to example system 700.

At 912, the binary search engine 104 or component may determine an intersection of search results of the searching. The process for determining the intersection is as described above, reference to FIGS. 1*a*-1*d* and 3. The binary search engine 104 or component may validate that the search results included in the intersection include the search query.

At 914, the binary search engine 104 or component may return those of the search results that were validated at 912 as including indications of files associated with file identifiers that are included in the intersection in response to the search query.

FIG. 10 is a flow diagram of an illustrative process 1000 associated with the binary search engine, including receiving an automatic notification request for a search query, performing search for byte sequences corresponding to that search query in an inverted index based on notification frequency, determining an intersection of the search results, generating a notification with indication of files identified in the intersection, and sending notification based on communication preference.

At 1002, the binary search engine 104 or another component of the computing device(s) 102 may receive an automatic notification request for a search query. The automatic notification request may be received from any communication interface presented to a user, including but not limited to a web interface or application console associated with a service provider. The search query may be any query as described above, with reference to FIGS. 1*a*-1*d* and the example system 700. The automatic notification request may be assigned a default notification frequency and communication method based on user's current preference.

At 1004, the binary search engine 104 or component may initiate a search based in part on an addition of a new file to the inverted index. As described above with reference to example system 700, a search may be triggered based on a notification frequency. However, if no new files have been added since the last notification was generated, a new search may not be needed at the next notification time. The binary search engine 104 or component may receive one or more new files to process and determine its status. Based on the status, the file may be associated with the inverted index, and a search based on the search query may be triggered.

At 1006, the binary search engine 104 or component may determine a plurality of byte sequences of a fixed length that correspond to the search query. The process for determining a plurality of byte sequences is as described above, reference to FIGS. 1*a*-1*d* and 3.

At 1008, the binary search engine 104 or component may search for each of the byte sequences in the inverted index that specifies byte sequences of the fixed length and, for each specified byte sequence, retrieve identifiers of files that include the specified byte sequence. The process for searching for each of the byte sequences is as described above, reference to FIGS. 1*a*-1*d* and 3.

At 1010, the binary search engine 104 or component may determine an intersection of search results of the searching. The process for determining an intersection is as described above, reference to FIGS. 1*a*-1*d* and 3. The binary search engine 104 or component may validate that the search results included in the intersection include the search query, before generating any notification.

At 1012, the binary search engine 104 or component may generate notification including indication of files associated with file identifiers that are included in the intersection in response to the search query. As described above with respect to example system 700, the binary search engine 104 or component may generate the notification in a format according to the preferred communication, e.g., RSS or Atom formats.

At 1014, the binary search engine 104 or component may send notification based on preferred communication setting(s). As described above with respect to example system 700, the binary search engine 104 or component may use the default communication setting that the user has already elected for current communication as the communication method for sending the notification. The binary search engine 104 or component may receive input from the user to change or set the communication method for the notifications or alerts. In various implementations, the communication methods may utilize any communication channel, including one or more of an e-mail message, a website associated with a service provider, a text message, a push notification, a social network site, or an application that is associated with a service provider and is residing on a client device.

Additional Further Illustrative Examples

Figure 11:
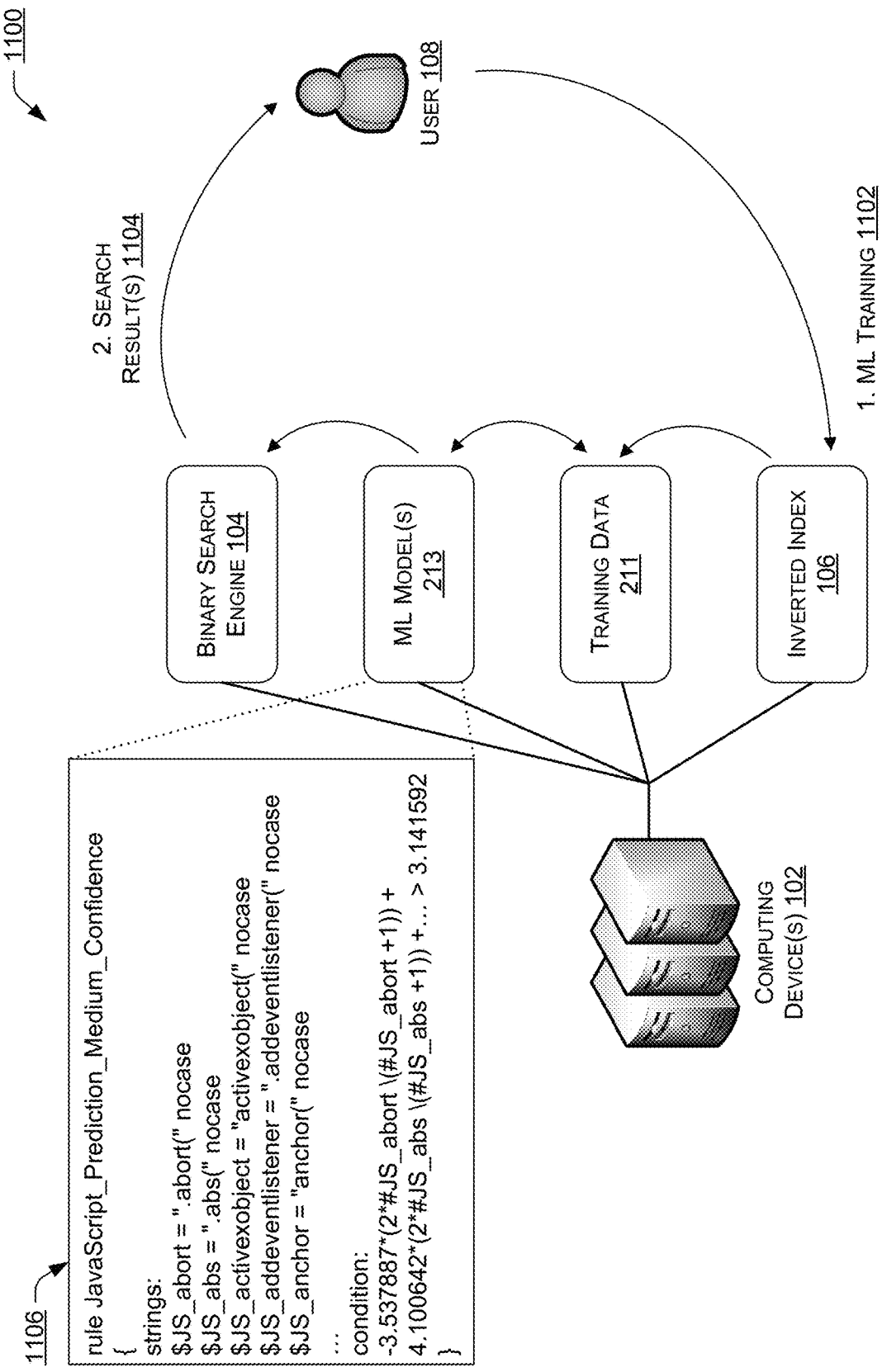
FIG. 11 illustrates an example system of computing device(s) configured with a binary search engine and an inverted index that may train a machine learning model to search the contents of binary files.

FIG. 11 illustrates an example system 1100 that may include one or more computing device(s) 102 configured with a binary search engine 104 and an inverted index 106 that may train a machine learning model to enable searching the contents of binary files, e.g., executable files. Some examples include creating training data 211 using files from the inverted index to train machine learning (ML) model(s) 213 that includes query rules. Additional examples include retraining the ML model(s) 213 until the decision value meets a predetermined confidence level (e.g., low, mid, high, etc.) and/or falls within a predetermined confidence interval (e.g., 0.99 is within the high confidence interval of [0.9, 1.0], etc.). Some examples include automatically searching with an embedded ML model(s) 213 and returning and/or generating notification with the search result(s) 1110 for a user 108.

As described above with respect to FIGS. 1*a*-1*d*, 7*a*, and 7*b*, the binary search engine 104 and the inverted index(s) 106 may each be distributed among the computing device(s) 102 with modules of the binary search engine 104 distributed among the computing device(s) 102 and/or parts of the inverted index(s) 106 distributed among the computing device(s) 102. As illustrated in example system 1100, the system may receive input from a user 108 to select certain files or data portion from the inverted index(s) 106 to create pre-featured training data 211 for the machine learning (ML) training 1102. It is to be appreciated that the inverted index(s) 106 may be constructed from a large corpus of files and the files may already be classified with security status of malware or clean. By using files already classified as malware or clean, less manual tagging would be needed from the user 108 to create the training data 211.

In some examples, the training data 211 may be selected from the inverted index(s) 106 based on having features that may be identified in the strings. The training data 211 is used to train ML model(s) 213 that includes query rules. The ML model(s) 213 includes a string section and a condition section. The string section includes the features. The condition section includes the weight associated with the features. For instance, in the example ML model 1106, the $JS_* are the features and the model equation normalize the features. In the example ML model 1106, the −3.537887 and 4.100642 are feature weights for the features $JS_abort and $JS_abs, respectively. The 3.141592 is the predetermined confidence threshold for a predetermined confidence level (e.g., medium confidence). The system may generate multiple variations of models with string section similar to the example ML model 1106 but different weights associated with some of the features and a different predetermined confidence threshold to generate ML model(s) of a different predetermined confidence level (e.g., low or high confidence).

In various examples, the training data 211 may be used to retrain ML model(s) 213. For instance, a first portion of the training data 211 may be used to train a first ML model. The first ML model may be applied to a second portion of the training data 211 with known malware or clean status to determine the decision value for the model. The first and second portion of the training data 211 may overlap. The decision value may be determined based on the number of false positives measured with respect to number of test samples in this second portion. If the decision value falls within a predetermined confidence threshold and/or predetermined confidence interval, the generated model is stored as a trained model for the confidence level (e.g., low, medium, high, etc.). If the decision value does not fall within the predetermined confidence threshold and/or predetermined confidence interval, the first ML model is retrained with the training data 211 and the false positives marked. Additionally, and/or alternatively, if the decision value does not fall within a predetermined confidence interval (e.g., 0.99 is within the high confidence interval of [0.9, 1.0], etc.), the predetermined confidence interval may be adjusted to avoid false positives. The retraining step may be repeated until the decision value meets the criterion that is the predetermined confidence threshold and/or predetermined confidence interval.

In additional implementations, the trained machine learning (ML) model(s) 213 for the different confidence levels may be embedded into the binary search engine 104 or another component of the computing device(s) 102 to perform searches and present the search result(s) 1104 or generate a notification to alert the user 108 of the search result(s) 1104. The binary search engine 104 or component may use the default communication setting that the user 108 has already elected for current communication as the communication method for sending the notification. The binary search engine 104 or component may receive input from the user 108 to change or set the communication method for the notifications or alerts. In various implementations, the communication methods may utilize any communication channel, including one or more of an e-mail message, a website associated with a service provider, a text message, a push notification, a social network site, or an application that is associated with a service provider and is residing on a client device.

Also described above with respect to FIGS. 1*a*-1*d*, 7*a*, and 7*b*, the binary search engine 104 may be configured to accept any sort of query from a user 108, including, but not limited to, text/string query, structured query, and specific byte sequence query. In additional implementations, the binary search engine 104 or another component of the computing device(s) 102 may embed ML model(s) 213 with search rules to perform automatic queries. The ML model(s) 213 may include search rules that includes one or more of: at least one rule; conditional search language; or at least one pattern-matching expression. In some implementations, the binary search engine 104, the ML model(s) 213, or another component of the computing device(s) 102 may be configured to support one or more anti-malware analyzing tools. Additionally, the binary search engine 104 or component may embed and process the ML model(s) 213 into one or more search terms and identify any conditional operator(s) that may be incorporated. Furthermore, the binary search engine 104 may then take any of a number of further acts described with respect to FIGS. 1*a*-2, 7*a*, and 7*b*.

Figure 13:
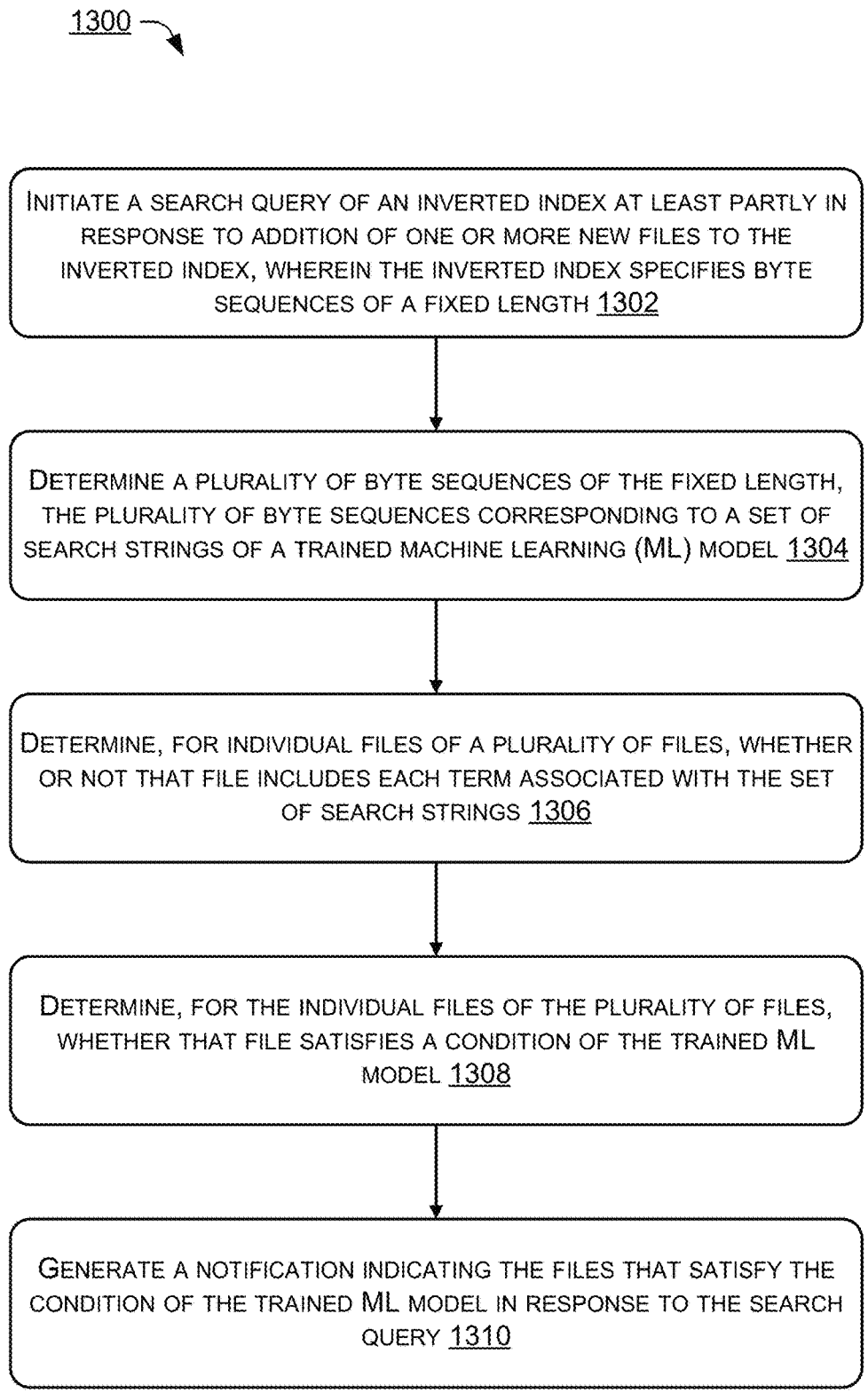
FIG. 13 is a flow diagram of an illustrative process associated with the binary search engine, including embedding a trained machine learning model to automatically perform a search query on an inverted index after adding new files.

In some examples, the processes of FIGS. 12 and 13 are implemented using computing device(s) 102 or 202, e.g., as discussed herein with reference to FIGS. 1*a*-2, and 11, and example system 1100. For example, the described operations can be carried out by processor(s) 214 under control of computer-executable instructions in system memory 204.

FIG. 12 is a flow diagram of an illustrative process 1200 associated with the binary search engine, including training a machine learning (ML) model to search an inverted index, determining a decision value the ML model, and performing a search of the inverted index using the ML model.

At 1202, the binary search engine 104 or another component of the computing device(s) 102 may generate a first machine learning (ML) model using pre-featured training data from an inverted index, the first ML model including a string section and a first condition section, the string section including one or more features, the first condition section including one or more weights corresponding to the one or more features. The binary search engine 104 or another component may create training data using pre-featured data from an inverted index, the pre-featured data including features in a string portion of the pre-featured data. The binary search engine 104 or another component may receive input from a user to select certain files or data portion from the inverted index(s) to create pre-featured training data for the machine learning (ML) training. It is to be appreciated that the inverted index(s) may be constructed from a large corpus of files and the files may already be classified with security status of malware or clean. By using files already classified as malware or clean, less manual tagging would be needed from the user to create the training data. In some examples, the training data may be selected from the inverted index(s) based on having features that may be identified in the strings. The training data is used to train ML model(s) that includes query rules. The binary search engine 104 or another component may generate multiple variations of ML model(s) with string section similar to the first ML model but different weights associated with some of the features and a different predetermined confidence threshold to generate ML model(s) of a different predetermined confidence level.

At 1204, the binary search engine 104 or component may determine a first decision value of the first ML model based at least in part on predetermined reference data including malicious files. The ML model is applied to a portion of the training data labeled with known malware/clean status to determine the decision value for the model. In some examples, if the decision value falls within a predetermined confidence threshold, the generated model is stored as a trained model for the confidence level (e.g., low, medium, high, etc.). If the decision value does not fall within the predetermined confidence threshold, the first ML model is retrained with the training data and the false positives marked. Additionally, and/or alternatively, if the decision value does not fall within a predetermined confidence interval (e.g., 0.99 is within the high confidence interval of [0.9, 1.0], etc.), the first ML model may be retrained with the training data 211 and the false positives marked, or the predetermined confidence interval may be adjusted to avoid false positives. In various examples, retraining steps may be repeated until the decision value meets the criterion that is the predetermined confidence threshold.

At 1206, the binary search engine 104 or another component of the computing device(s) 102 may generate a second ML model using the pre-featured training data and false positives from determining the first decision value, the second ML model including the string section and a second condition section, the second condition section including at least one different weight of the one or more weights. The binary search engine 104 or another component may create training data using pre-featured data from an inverted index, the pre-featured data including features in a string portion of the pre-featured data. The binary search engine 104 or another component may receive input from a user to select certain files or data portion from the inverted index(s) to create pre-featured training data for the machine learning (ML) training. It is to be appreciated that the inverted index(s) may be constructed from a large corpus of files and the files may already be classified with security status of malware or clean. By using files already classified as malware or clean, less manual tagging would be needed from the user to create the training data. In some examples, the training data may be selected from the inverted index(s) based on having features that may be identified in the strings. The training data is used to train ML model(s) that includes query rules. The binary search engine 104 or another component may generate multiple variations of ML model(s) with string section similar to the first ML model but different weights associated with some of the features and a different predetermined confidence threshold to generate ML model(s) of a different predetermined confidence level.

At 1208, the binary search engine 104 or component may determine a second decision value of the second ML model based at least in part on the predetermined reference data. The first ML model is applied to a portion of the training data labeled with known malware/clean status to determine the decision value for the model. If the decision value does not fall within the predetermined confidence threshold and/or predetermined confidence interval, the first ML model is retrained with the training data and the false positives marked. In various examples, retraining steps may be repeated until the decision value meets the criterion that is the predetermined confidence interval.

At 1210, the binary search engine 104 or component may perform a first search of the inverted index using the first ML model. As described above, with reference to FIGS. 1*a*-2 and 7, the binary search engine 104 or another component of the computing device(s) 102 may process portions of the string section of the ML model into one or more search terms according to the query language(s), regular expression(s), or other expression format(s) supported by the system. The system may also interpret conditional search language or search rules and apply any condition that may apply before conducting a search. The binary search engine 104 or another component may apply any conditional search language or search rules after searching for all the search terms.

At 1212, the binary search engine 104 or component may perform a second search of the inverted index using the second ML model.

FIG. 13 is a flow diagram of an illustrative process 1300 associated with the binary search engine, including embedding a trained machine learning model to automatically perform a search query on an inverted index after adding new files, performing search for byte sequences corresponding to that search query in an inverted index, and generating notification in response to the search query.

At 1302, the binary search engine 104 or component may initiate a search query of an inverted index at least partly in response to addition of one or more new files to the inverted index, wherein the inverted index specifies byte sequences of a fixed length. As described above with reference to FIGS. 1*a*-1*d* and the example system 700, the binary search engine 104 or component may receive one or more new files to process and determine its status. Based on the status, the file may be associated with the inverted index, and a search based on the search query may be triggered.

At 1304, the binary search engine 104 or component may determine a plurality of byte sequences of the fixed length, the plurality of byte sequences corresponding to a set of search strings of a trained machine learning (ML) model. The trained ML model may be a query rule that includes a string section and a condition section. The string section may include a set of search strings. The process for determining a plurality of byte sequences is as described above, reference to FIGS. 1*a*-1*d*.

At 1306, the binary search engine 104 or component may determine, for individual files of a plurality of files, whether or not that file includes each term associated with the set of search strings. As described above, with respect to process 1304, the plurality of byte sequences has been determined. The binary search engine 104 or component may search for each of the byte sequences in the inverted index that specifies byte sequences of the fixed length and, for each specified byte sequence, file identifiers of files that include the specified byte sequence. The process for searching for each of the byte sequences is as described above, reference to FIGS. 1*a*-1*d*.

At 1308, the binary search engine 104 or component may determine, for the individual files of the plurality of files, whether that file satisfies a condition of the trained ML model. As described above with respect to the process 1304, the trained ML model may be a query rule that includes a string section and a condition section. The string section of the trained ML model may include at least one search query that may be any query as described above, with reference to FIGS. 1*a*-1*d* and the example system 700. The binary search engine 104 or component may determine an intersection of search results of the search query. The process for determining an intersection is as described above, reference to FIGS. 1*a*-1*d* and 3. The binary search engine 104 or component may validate that the search results included in the intersection include the search query and determine that the file satisfies a condition of the trained ML model, before generating any notification.

At 1310, the binary search engine 104 or component may generate a notification indicating the files that satisfy the condition of the trained ML model in response to the search query. As described above with respect to example system 1100, the binary search engine 104 or component may generate the notification in a format according to the preferred communication, e.g., RSS or Atom formats. The binary search engine 104 or component may use a default communication setting for as the communication method for sending the notification. The binary search engine 104 or component may receive input from a user to change or set the communication method for the notifications or alerts. In various implementations, the communication methods may utilize any communication channel, including one or more of an e-mail message, a website associated with a service provider, a text message, a push notification, a social network site, or an application that is associated with a service provider and is residing on a client device.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A system comprising: one or more processors; and programming instructions configured to be executed by the one or more processors to perform operations including: receiving a search query; determining a plurality of byte sequences of a fixed length that correspond to the search query; searching for each of the byte sequences in an inverted index that specifies byte sequences of the fixed length and, for each specified byte sequence, file identifiers of files that include the specified byte sequence; determining an intersection of search results of the searching; and returning indications of files associated with file identifiers that are included in the intersection in response to the search query.

B: The system of paragraph A, wherein the operations further include generating the inverted index from a corpus of files, the generating including specifying at least a subset of byte sequences of the fixed length found in at least one file of the corpus of files and, for each byte sequence in the subset of byte sequences, file identifiers of one or more files in the corpus of files that include that byte sequence.

C: The system of paragraph B, wherein the corpus of files is a corpus of malware files.

D: The system of any of paragraphs A-C, wherein the files are binary files or executable files.

E: The system of any of paragraphs A-D, wherein the system includes a plurality of computing devices and the one or more processors, execution of the programming instructions, and inverted index are distributed across the computing devices.

F: The system of any of paragraphs A-E, wherein the byte sequences of the fixed length are n-grams with a length of four bytes.

G: The system of any of paragraphs A-F, wherein the operations further include validating that the search results included in the intersection include the search query before returning the indications.

H: A computer implemented method comprising: for each byte sequence of a fixed length comprising a file, searching an inverted index which specifies byte sequences of the fixed length and, for each specified byte sequence, file identifiers of files that include the specified byte sequence, wherein each file identifier is associated with a security status; based on results of the search, creating a list of candidate byte sequences, wherein the candidate byte sequences are only found in files with file identifiers that are associated with a malware status or an unknown status; selecting ones of the candidate byte sequences that are associated with the most file identifiers; and generating a signature from selected ones of the candidate byte sequences.

I: The method of paragraph H, wherein the byte sequences of the fixed length are n-grams with a length of four bytes.

J: The method of paragraph H or I, wherein the searching further comprises determining the byte sequences of the fixed length comprising the file.

K: The method of any of paragraphs H-J, wherein the security status associated with each file identifier is one of a malware status, a clean status, an unknown status, or another status indicating a level of trust.

L: The method of any of paragraphs H-K, wherein the searching further comprises filtering out byte sequences known to be found in files with file identifiers associated with a clean status and searching for the remaining byte sequences comprising the file.

M: The method of any of paragraphs H-L, wherein the creating further comprises determining a security status for each file identifier returned from the search, the security status being metadata for the file identifier.

N: The method of any of paragraphs H-M, further comprising providing the signature to a security service.

O: A computer-implemented method comprising: receiving an expression as a search query, the expression including at least one logical operator and at least two search terms; searching for byte sequences of a fixed length that comprise each of the search terms in an inverted index which specifies byte sequences of the fixed length and, for each specified byte sequence, file identifiers of files that include the specified byte sequence; evaluating results of the searching using a syntax tree constructed from the at least one logical operator; and returning a search result to the search query based on the evaluating.

P: The method of paragraph O, wherein the byte sequences of the fixed length are n-grams with a length of four bytes.

Q: The method of paragraph O or P, wherein the searching further comprises determining a plurality of byte sequences of a fixed length that correspond to each search term.

R: The method of any of paragraphs O-Q, further comprising constructing the syntax tree based on the at least one logical operator, wherein the search terms are evaluated as leaves of the syntax tree, each leaf comprising one or more byte sequences associated with one of the search terms.

S: The method of any of paragraphs O-R, further comprising, before performing the returning, validating that a file corresponding to the search result satisfies the expression.

T: One or more non-transitory computer-readable media having stored thereon programming instructions that, when executed by one or more processors, cause the one or more processors to perform operations including: for each byte sequence of a fixed length comprising a file, searching an inverted index which specifies byte sequences of the fixed length and, for each specified byte sequence, file identifiers of files that include the specified byte sequence; identifying a subset of search results of the searching that are associated with the fewest file identifiers; and constructing a fuzzy hash from byte sequences comprising the subset of the search results.

U: The one or more non-transitory computer-readable media of paragraph T, wherein the byte sequences of the fixed length are n-grams with a length of four bytes.

V: The one or more non-transitory computer-readable media of paragraph T or U, wherein the searching further comprises determining the byte sequences of the fixed length comprising the file.

W: The one or more non-transitory computer-readable media of any of paragraphs T-V, wherein the identifying is based at least in part on a relatedness confidence threshold.

X: The one or more non-transitory computer-readable media of any of paragraphs T-W, wherein the operations further comprise providing the fuzzy hash to a security service.

Y. A system comprising: one or more processors; and programming instructions configured to be executed by the one or more processors to perform operations including: receiving an expression as a search query, the expression including at least one of a rule statement or one or more metacharacters, wherein the one or more metacharacters includes one or more characters defined with one or more specific functions; interpreting the expression into one or more search terms; searching for byte sequences that comprise the one or more search terms in an inverted index which specifies byte sequences of the fixed length and, for specified byte sequence of the byte sequences, file identifiers of files that include the specified byte sequence; evaluating results of the searching based on the expression; and returning a search result to the search query based on the evaluating.

Z. The system of paragraph Y, wherein the expression includes the rule statement with one or more logical operators, and wherein the operations further comprise: constructing a syntax tree from the one or more logical operators; and evaluating the results using the syntax tree.

AA. The system of paragraph Z, wherein the operations further include constructing the syntax tree based on the one or more logical operators, wherein the one or more search terms are evaluated as leaves of the syntax tree, each leaf comprising one or more byte sequences associated with one of the one or more search terms.

AB. The system of any of paragraphs Y-AA, wherein the expression includes at least one metacharacter defining a grouping function, and wherein interpreting the expression into one or more search terms includes applying the grouping function to a text string portion of the expression.

AC. The system of any of paragraphs Y-AB, wherein the expression includes at least one metacharacter defining a search pattern function, and wherein interpreting the expression into one or more search terms includes applying the search pattern function to a text string portion of the expression.

AD. The system of any of paragraphs Y-AC, wherein the system includes a plurality of computing devices and the one or more processors, execution of the programming instructions, and inverted index are distributed across the plurality of computing devices.

AE. The system of any of paragraphs Y-AD, wherein the operations further include, before performing the returning, validating that a file corresponding to the search result satisfies the expression.

AF. A computer implemented method comprising: generating an inverted index that specifies byte sequences from a corpus of files; distributing a first portion of the inverted index to a first computing device and a remaining portion of the inverted index to a second computing device; receiving a search query; determining a plurality of byte sequences that correspond to the search query; searching for individual byte sequences of the plurality of byte sequences in the inverted index, wherein searching for the individual byte sequences includes contemporaneously: conducting a first search on the first computing device to provide first search results; and conducting a second search on the second computing device to provide second search results; determining third search results as an intersection of the first search results and the second search results; and returning indications of files associated with file identifiers that are included in the third search results, in response to the search query.

AG. The method of paragraph AF, further including validating that the search results included in the intersection include the search query before returning the indications.

AH. The method of paragraph AF or AG, wherein the searching further comprises determining the files includes the byte sequences.

AI. The method of any of paragraphs AF-AH, wherein the corpus of files is a corpus of malware files.

AJ. The method of any of paragraphs AF-AI, wherein the files are binary files or executable files.

AK. The method of any of paragraphs AF-AJ, wherein the byte sequences of the fixed length are n-grams with a length of four bytes.

AL. The method of any of paragraphs AF-AK, wherein generating the inverted index includes specifying at least a subset of byte sequences of the fixed length found in at least one file of the corpus of files and, for each byte sequence in the subset of byte sequences, file identifiers of one or more files in the corpus of files that include that byte sequence.

AM. A computer-implemented method comprising: receiving an automatic notification request including a search query; initiating a search based at least in part on addition of one or more new files to an inverted index; determining a plurality of byte sequences of a fixed length that correspond to the search query; searching for each of the byte sequences in the inverted index that specifies byte sequences of the fixed length and, for each specified byte sequence, file identifiers of files that include the specified byte sequence; determining an intersection of search results of the searching; and generating a notification message indicating the files associated with file identifiers that are included in the intersection in response to the search query.

AN. The method of paragraph AM, wherein the automatic notification request further includes a notification frequency, and wherein initiating the search includes running the search at the notification frequency.

AO. The method of paragraph AM or AN, wherein the automatic notification request further includes a notification criterion for identifying at least one new file intersecting with the search query.

AP. The method of any of paragraphs AM-AO, further comprising validating that the search results included in the intersection include the search query.

AQ. The method of paragraph AP, wherein the automatic notification request further includes a preferred communication method selected from one or more of an email, a push notification, a text message, a website, or an application, and further comprising sending the notification message by the preferred communication method.

AR. The method of any of paragraphs AM-AQ, wherein the automatic notification request further includes a notification criterion for identifying at least one new file intersecting with the search query, and the method further comprises: determining that the notification criterion has been satisfied; and in response, sending the notification message.

AS: A computer-readable medium, e.g., a computer storage medium, having thereon computer-executable instructions, the computer-executable instructions upon execution configuring a computer to perform operations as any of paragraphs H-S, AF-AL, or AM-AR recites.

AT: A device comprising: a processor; and a computer-readable medium, e.g., a computer storage medium, having thereon computer-executable instructions, the computer-executable instructions upon execution by the processor configuring the device to perform operations as any of paragraphs H-S, AF-AL, or AM-AR recites.

AU: A system comprising: means for processing; and means for storing having thereon computer-executable instructions, the computer-executable instructions including means to configure the system to carry out a method as any of paragraphs H-S, AF-AL, or AM-AR recites.

CONCLUSION

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or 'may,' unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

This disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing devices 102, such as one or more internal or external CPUs or GPUs, or one or more pieces of hardware logic such as FPGAs, DSPs, or other types of accelerators.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   generating a first machine learning (ML) model using pre-featured training data from an inverted index, the first ML model including a string section and a first condition section, the string section including one or more features, the first condition section including one or more weights corresponding to the one or more features;
   determining a first decision value of the first ML model based at least in part on predetermined reference data including malicious files;
   generating a second ML model using the pre-featured training data and false positives from determining the first decision value, the second ML model including the string section and a second condition section, the second condition section including at least one different weight of the one or more weights;
   determining a second decision value of the second ML model based at least in part on the predetermined reference data;
   performing a first search of the inverted index using the first ML model; and
   performing a second search of the inverted index using the second ML model.

2. The method of claim 1, further comprising:
   determining that the first decision value is below a first confidence threshold;
   determining that the second decision value meets the first confidence threshold; and
   associating the second ML model with a first confidence level based at least in part on the second decision value meeting the first confidence threshold, the first confidence level including a first confidence interval.

3. The method of claim 2, further comprising:
determining that the second decision value is below a second confidence threshold associated with a second confidence level, the second confidence level including a second confidence interval; and
generating a third ML model using the pre-featured training data and false positives from determining the second decision value.

4. The method of claim 3, further comprising:
determining that a third decision value associated with the third ML model meets the second confidence threshold; and
associating the third ML model with the second confidence level.

5. The method of claim 1, further comprising expressing the second ML model as a query language model to perform search of the inverted index.

6. A computer implemented method comprising:
generating an inverted index that specifies byte sequences from a corpus of files;
creating training data using pre-featured data from the inverted index, the pre-featured data including features in a string portion of the pre-featured data;
generating a first machine learning (ML) model using the training data wherein the first ML model includes a first feature associated with a first weight and a second feature associated with a second weight;
determining a decision value of the first ML model is outside of a confidence interval, wherein the decision value is based at least in part on a ratio of false positives to total searches;
generating a second ML model using the training data and the false positives from determining the decision value; and
initiating a search query of the inverted index at least partly in response to addition of one or more new files to the inverted index, wherein the inverted index specifies byte sequences of a fixed length.

7. The method of claim 6, further comprising:
applying the first ML model to search a test sample of the inverted index; and
determining that the decision value for the first ML model is within the confidence interval.

8. The method of claim 7, further comprising:
applying the first ML model to search the inverted index.

9. The method of claim 8, further comprising:
validating search results with the first ML model; and
returning the search results.

10. The method of claim 7, further comprising:
expressing the first ML model as a query language to automatically perform a search query on the inverted index.

11. The method of claim 7, further comprising:
determining a second decision value is outside of a second confidence interval based at least in part on a second ratio of second false positives to second total searches.

12. The method of claim 11, further comprising:
generate a third ML model using the training data and the second false positives.

13. The method of claim 12, wherein generating the third ML model includes repeating training for the third ML model until the second decision value is within the second confidence interval.

14. The method of claim 13, wherein repeating the training includes adjusting at least one of the first weight or the second weight.

15. The method of claim 6, wherein the corpus of files includes a corpus of malware files.

16. One or more non-transitory computer readable media storing computer-executable instructions that, when executed, cause one or more processors to perform operations comprising:
generating an inverted index that specifies byte sequences from a corpus of files;
creating training data using pre-featured data from the inverted index, the pre-featured data including features in a string portion of the pre-featured data;
generating a first machine learning (ML) model using the training data, wherein the first ML model includes a first feature associated with a first weight and a second feature associated with a second weight;
determining a decision value of the first ML model is outside of a confidence interval, wherein the decision value is based at least in part on a ratio of false positives to total searches;
generating a second ML model using the training data and the false positives from determining the decision value; and
initiating a search query of the inverted index at least partly in response to addition of one or more new files to the inverted index, wherein the inverted index specifies byte sequences of a fixed length.

17. The one or more non-transitory computer readable media of claim 16, the operations further comprising:
applying the first ML model to search a test sample of the inverted index; and
determining that a decision value for the first ML model is within a confidence interval.

18. The one or more non-transitory computer readable media of claim 17, the operations further comprising:
applying the first ML model to search the inverted index;
validating search results with the first ML model; and
returning the search results.

19. The one or more non-transitory computer readable media of claim 17, the operations further comprising:
determining that the decision value is outside of a second confidence interval; and
repeating the training for the second ML model until the decision value meets is within the second confidence interval.

20. The one or more non-transitory computer readable media of claim 16, the operations further comprising:
determining a plurality of byte sequences of the fixed length, the plurality of byte sequences corresponding to a set of search strings of the first ML model.

* * * * *